US012695923B2

(12) United States Patent
Lin et al.

(10) Patent No.: US 12,695,923 B2
(45) Date of Patent: Jul. 28, 2026

(54) NETWORK RESOURCE ALLOCATION METHOD AND APPARATUS, AND STORAGE MEDIUM

(71) Applicant: HUAWEI CLOUD COMPUTING TECHNOLOGIES CO., LTD., Gui'an New District (CN)

(72) Inventors: Sijie Lin, Dongguan (CN); Wen Peng, Shenzhen (CN); Junyan Yang, Shenzhen (CN); Changpeng Yang, Gui'an (CN)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 0 days.

(21) Appl. No.: 19/069,943

(22) Filed: Mar. 4, 2025

(65) Prior Publication Data

US 2025/0203129 A1      Jun. 19, 2025

Related U.S. Application Data

(63) Continuation of application No. PCT/CN2023/111572, filed on Aug. 7, 2023.

(30) Foreign Application Priority Data

Sep. 6, 2022 (CN) .......................... 202211085847.5

(51) Int. Cl.
*H04N 21/2187* (2011.01)
*H04N 21/238* (2011.01)
(Continued)

(52) U.S. Cl.
CPC ....... *H04N 21/2187* (2013.01); *H04N 21/238* (2013.01); *H04N 21/26208* (2013.01); *H04N 21/47202* (2013.01)

(58) Field of Classification Search
CPC ............. H04N 21/2187; H04N 21/238; H04N 21/26208; H04N 21/47202;
(Continued)

(56) References Cited

FOREIGN PATENT DOCUMENTS

| CN | 108366020 A | 8/2018 |
| CN | 110572687 A | 12/2019 |

(Continued)

OTHER PUBLICATIONS

International Search Report and Written Opinion in International Appln. No. PCT/CN2023/111572, mailed on Oct. 17, 2023, 16 pages (with English translation).

*Primary Examiner* — Anthony Bantamoi
(74) *Attorney, Agent, or Firm* — Fish & Richardson P.C.

(57) ABSTRACT

Example network resource allocation methods and apparatus are described. One example method includes obtaining service requirement information of a live service and data stream attribute information of the live service in a first time period. The service requirement information describes a status of transmitting a data stream of the live service in a content delivery network in the first time period, and the first time period is after a current time. The method further includes obtaining, based on the service requirement information and the data stream attribute information, retrieval traffic and output traffic that are generated by the live service in the first time period. A network resource in the content delivery network is allocated based on the retrieval traffic and the output traffic.

20 Claims, 6 Drawing Sheets

(51) Int. Cl.
    *H04N 21/262*      (2011.01)
    *H04N 21/472*      (2011.01)
(58) Field of Classification Search
    CPC .............. H04N 21/2385; H04N 21/262; H04L
              41/5019; H04L 41/5054; H04L 47/781;
             H04L 47/805; H04L 47/822; H04L 47/83;
              H04L 65/61; H04L 65/612; H04L 65/80
    See application file for complete search history.

(56)                        References Cited

FOREIGN PATENT DOCUMENTS

| CN | 111327461 A | 6/2020 |
| CN | 112929676 A | 6/2021 |
| CN | 114501073 A | 5/2022 |
| JP | 2007241667 A | 9/2007 |

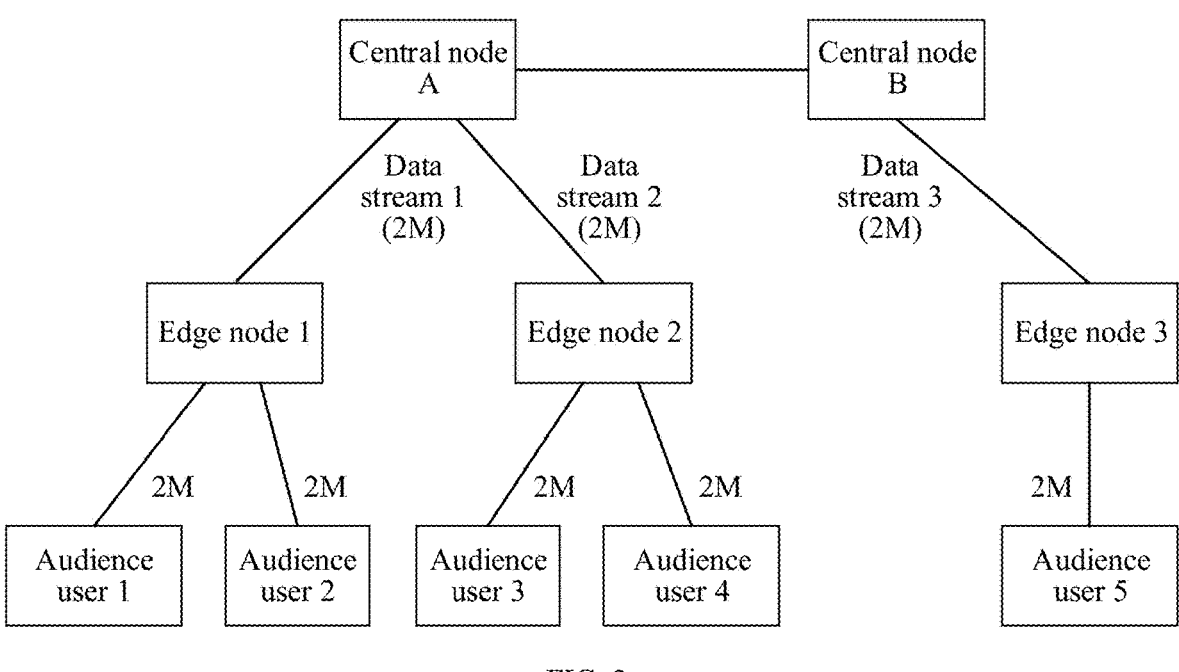

FIG. 3

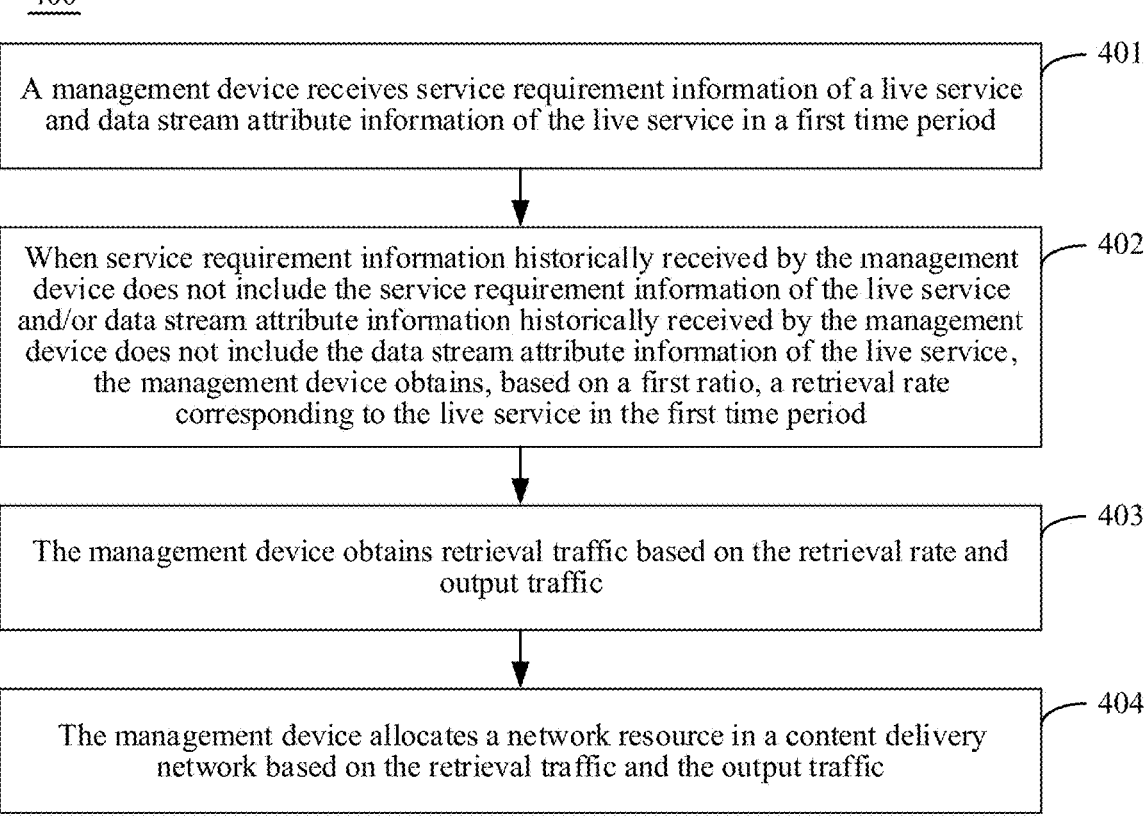

400

A management device receives service requirement information of a live service and data stream attribute information of the live service in a first time period — 401

When service requirement information historically received by the management device does not include the service requirement information of the live service and/or data stream attribute information historically received by the management device does not include the data stream attribute information of the live service, the management device obtains, based on a first ratio, a retrieval rate corresponding to the live service in the first time period — 402

The management device obtains retrieval traffic based on the retrieval rate and output traffic — 403

The management device allocates a network resource in a content delivery network based on the retrieval traffic and the output traffic — 404

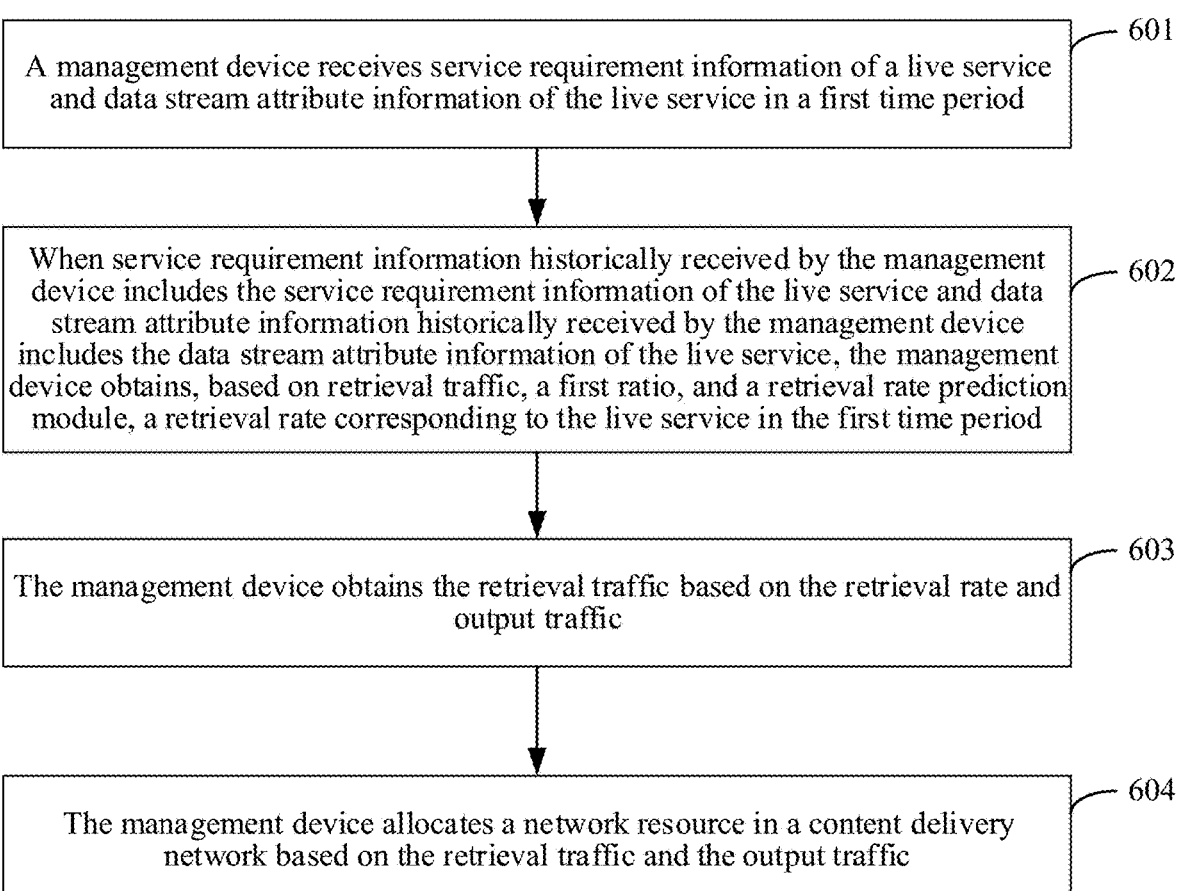

601

A management device receives service requirement information of a live service and data stream attribute information of the live service in a first time period

602

When service requirement information historically received by the management device includes the service requirement information of the live service and data stream attribute information historically received by the management device includes the data stream attribute information of the live service, the management device obtains, based on retrieval traffic, a first ratio, and a retrieval rate prediction module, a retrieval rate corresponding to the live service in the first time period

603

The management device obtains the retrieval traffic based on the retrieval rate and output traffic

604

The management device allocates a network resource in a content delivery network based on the retrieval traffic and the output traffic

NETWORK RESOURCE ALLOCATION METHOD AND APPARATUS, AND STORAGE MEDIUM

CROSS-REFERENCE TO RELATED APPLICATIONS

This application is a continuation of International Application No. PCT/CN2023/111572, filed on Aug. 7, 2023, which claims priority to Chinese Patent Application No. 202211085847.5, filed on Sep. 6, 2022. The disclosures of the aforementioned applications are hereby incorporated by reference in their entireties.

TECHNICAL FIELD

This disclosure relates to the communication field, and in particular, to a network resource allocation method and apparatus, and a storage medium.

BACKGROUND

In a live video scenario, an operator of a live service uses a content delivery network established by a cloud vendor to transmit a live service. An anchor user of the live service sends a data stream to the content delivery network, and an audience user of the live service pulls the data stream from the content delivery network. In this way, the live service is transmitted by using the content delivery network.

The operator of the live service may apply to the cloud vendor for using the content delivery network to transmit the live service in a period of time. The cloud vendor needs to allocate a network resource to the applied live service in the content delivery network, and the content delivery network uses the allocated network resource to transmit the live service in this period of time. A current network resource allocation manner is fixed and not flexible enough, resulting in low network resource allocation flexibility.

SUMMARY

This disclosure provides a network resource allocation method and apparatus, and a storage medium, to improve flexibility of allocating a network resource. The technical solutions are as follows:

According to a first aspect, this disclosure provides a network resource allocation method. In the method, a management device obtains service requirement information of a live service and data stream attribute information of the live service in a first time period, where the service requirement information is used to describe a status of transmitting a data stream of the live service in a content delivery network in the first time period, the first time period is after a current time, the content delivery network includes a central node and an edge node, the central node is configured to send a data stream from an anchor user of the live service to the edge node, and the edge node is configured to send the data stream to an audience user requesting the data stream. The management device obtains, based on the service requirement information and the data stream attribute information, retrieval traffic and output traffic that are generated by the live service in the first time period, where the retrieval traffic is traffic generated by sending the data stream by the central node, and the output traffic is traffic generated by sending the data stream by the edge node. The management device allocates a network resource in the content delivery network based on the retrieval traffic and the output traffic.

2

Because the data stream attribute information of the live service is obtained, and the traffic generated by the live service in the first time period is obtained based on the service attribute information and the service requirement information of the live service, traffic is obtained with reference to a data stream attribute of the live service. Data stream attributes of the live service in different time periods may be different, retrieval traffic obtained based on different data stream attribute information is different, and a network resource is allocated based on the obtained retrieval traffic and output traffic, thereby improving flexibility of allocating the network resource.

In a possible implementation, a fee required for transmitting the live service in the content delivery network is obtained based on the retrieval traffic and the output traffic. Retrieval traffic obtained based on different data stream attribute information is different, and a fee is obtained based on the obtained retrieval traffic and output traffic, thereby improving charging flexibility.

In another possible implementation, the service requirement information includes the output traffic, and the data stream attribute information includes a first ratio of a cold stream, a warm stream, and a hot stream of the live service. A retrieval rate corresponding to the live service in the first time period is obtained based on the first ratio, where the retrieval rate is a ratio of the retrieval traffic to the output traffic. The retrieval traffic is obtained based on the retrieval rate and the output traffic.

Because the data stream attribute information of the live service affects the retrieval rate of the live service, the retrieval rate corresponding to the live service can be accurately obtained based on the first ratio, and accuracy of obtaining the retrieval traffic can be improved based on the retrieval rate.

In another possible implementation, the cold stream is a data stream requested by a quantity of audience users that does not exceed a cold stream threshold, the warm stream is a data stream requested by a quantity of audience users that exceeds the cold stream threshold and does not exceed a hot stream threshold, and the hot stream is a data stream requested by a quantity of audience users that exceeds the hot stream threshold, where the hot stream threshold is greater than the cold stream threshold.

In another possible implementation, the service requirement information further includes a total quantity of data streams that need to be sent by the anchor user of the live service to the central node in the first time period. The retrieval rate corresponding to the live service in the first time period is obtained based on the total quantity of data streams and the first ratio. Because the total quantity of data streams sent by the anchor user of the live service to the central node also affects the retrieval rate of the live service, accuracy of obtaining the retrieval rate is improved based on the total quantity of data streams and the first ratio.

In another possible implementation, a quantity of edge nodes corresponding to each stream type in the first time period is obtained based on a quantity of standard edge nodes corresponding to each of the plurality of stream types, where a quantity of audience users requesting a data stream of each stream type is different. A quantity of data streams corresponding to each stream type in the first time period is obtained based on a quantity of standard data streams corresponding to each stream type and the first ratio. The retrieval rate corresponding to the live service in the first time period is obtained based on the quantity of data streams and the quantity of edge nodes that correspond to each stream type. In this way, the retrieval rate corresponding to the live service in the first time period is obtained based on the first ratio.

In another possible implementation, the quantity of edge nodes corresponding to each stream type in the first time period is obtained based on network information of the content delivery network and the quantity of standard edge nodes corresponding to each stream type. Precision of obtaining the quantity of edge nodes can be improved based on the network information, and further, precision of obtaining the retrieval rate can be improved.

In another possible implementation, when historically obtained service requirement information does not include the service requirement information of the live service and/or historically obtained data stream attribute information does not include the data stream attribute information of the live service, the retrieval rate corresponding to the live service in the first time period is obtained based on the first ratio.

In another possible implementation, the service requirement information includes the output traffic, and the data stream attribute information includes a first ratio of a cold stream, a warm stream, and a hot stream included in the live service. A retrieval rate corresponding to the live service in the first time period is obtained based on the retrieval traffic, the first ratio, and a retrieval rate prediction model, where the retrieval rate is a ratio of the retrieval traffic to the output traffic. The retrieval traffic is obtained based on the retrieval rate and the output traffic. Because the data stream attribute information of the live service affects the retrieval rate of the live service, the retrieval rate corresponding to the live service can be accurately obtained based on the retrieval traffic, the first ratio, and the retrieval rate prediction model. In addition, because efficiency of obtaining the retrieval rate by using the retrieval rate prediction model is high, efficiency of allocating the network resource is also improved.

In another possible implementation, the service requirement information further includes a total quantity of data streams that need to be sent by the anchor user of the live service to the central node in the first time period. The retrieval rate corresponding to the live service in the first time period is obtained based on the total quantity of data streams, the retrieval traffic, the first ratio, and the retrieval rate prediction model. Because the total quantity of data streams sent by the anchor user of the live service to the central node also affects the retrieval rate of the live service, accuracy of obtaining the retrieval rate can be improved by introducing the total quantity of data streams.

In another possible implementation, a total quantity of edge nodes included in the content delivery network in the first time period is obtained. The retrieval rate corresponding to the live service in the first time period is obtained based on the total quantity of edge nodes, the total quantity of data streams, the retrieval traffic, the first ratio, and the retrieval rate prediction model. Because the total quantity of edge nodes included in the content delivery network affects the retrieval rate of the live service, precision of obtaining the retrieval rate can be improved by introducing the total quantity of edge nodes.

In another possible implementation, at least one derivative feature corresponding to the live service is obtained based on the output traffic, the total quantity of data streams, and/or the total quantity of edge nodes. The retrieval rate corresponding to the live service in the first time period is obtained based on the at least one derivative feature, the total quantity of edge nodes, the total quantity of data streams, the retrieval traffic, the first ratio, and the retrieval rate prediction model. Precision of obtaining the retrieval rate can be further improved by introducing the at least one derivative feature.

In another possible implementation, the at least one derivative feature includes one or more of the following: a total quantity of audience users of the live service in the first time period, an average quantity of audience users corresponding to the data stream sent by the anchor user of the live service, average output traffic corresponding to the data stream sent by the anchor user of the live service, an average quantity of data streams sent by the edge node in the first time period, an average quantity of audience users requesting the data stream from the edge node in the first time period, or average output traffic sent by the edge node in the first time period.

The total quantity of audience users is obtained based on the output traffic and a standard data amount of the data stream of the live service; and/or the average quantity of audience users is obtained based on the total quantity of audience users and the total quantity of data streams; and/or the average output traffic is obtained based on the output traffic and the total quantity of data streams; and/or the average quantity of data streams is obtained based on the total quantity of data streams and the total quantity of edge nodes; and/or the average quantity of audience users is obtained based on the total quantity of audience users and the total quantity of edge nodes; and/or the average output traffic is obtained based on the output traffic and the total quantity of edge nodes. In this way, the at least one derivative feature is obtained.

In another possible implementation, when historically obtained service requirement information includes the service requirement information of the live service and historically obtained data stream attribute information includes the data stream attribute information of the live service, the retrieval rate corresponding to the live service in the first time period is obtained based on the retrieval traffic, the first ratio, and the retrieval rate prediction model, thereby improving precision of obtaining the retrieval rate.

In another possible implementation, the retrieval rate prediction model is obtained based on at least one training sample. Because each training sample includes historically obtained retrieval traffic, a historically obtained first ratio, and a retrieval rate obtained based on the historically obtained retrieval traffic and the historically obtained first ratio, precision of the retrieval rate prediction model can be improved.

According to a second aspect, this disclosure provides a network resource allocation apparatus, configured to perform the method according to any one of the first aspect or the possible implementations of the first aspect. Specifically, the apparatus includes a unit configured to perform the method according to any one of the first aspect or the possible implementations of the first aspect.

According to a third aspect, this disclosure provides a computer device, including at least one processor and a memory. The at least one processor is configured to: be coupled to the memory, and read and execute instructions in the memory, to implement the method according to any one of the first aspect or the possible implementations of the first aspect.

According to a fourth aspect, this disclosure provides a computer program product. The computer program product includes a computer program stored in a computer-readable storage medium, and the computer program is loaded by a processor to implement the method in any one of the first aspect or the possible implementations of the first aspect.

According to a fifth aspect, this disclosure provides a computer-readable storage medium, configured to store a computer program. The computer program is loaded by a processor to perform the method according to any one of the first aspect or the possible implementations of the first aspect.

According to a sixth aspect, this disclosure provides a chip. The chip includes a memory and a processor. The memory is configured to store computer instructions, and the processor is configured to invoke the computer instructions from the memory and run the computer instructions, to perform the method according to any one of the first aspect or the possible implementations of the first aspect.

BRIEF DESCRIPTION OF DRAWINGS

FIG. 3 is a diagram of a structure of another content delivery network according to an embodiment of this disclosure;

FIG. 4 is a flowchart of a network resource allocation method according to an embodiment of this disclosure;

FIG. 6 is a flowchart of another network resource allocation method according to an embodiment of this disclosure;

DESCRIPTION OF EMBODIMENTS

The following further describes some embodiments of this disclosure with reference to accompanying drawings.

In a live service, a live platform uses a basic cloud service provided by a cloud vendor, and mainly uses a content delivery network established by the cloud vendor to support the live service. Cloud vendors establish nodes of content delivery networks around the world. The node of the content delivery network includes a source node, a central node, and an edge node. The content delivery network is an end-to-end full-link network. An anchor user of the live service accesses from the edge node of the content delivery network, and sends a data stream of the live service to the content delivery network. An audience user of the live service also accesses from the edge node of the content delivery network, and obtains the data stream of the live service from the content delivery network for watching. Before the data stream of the live service is transmitted by using the content delivery network, the live platform pays the cloud vendor according to traffic generated by the live service that is budgeted by the cloud vendor.

Figure 1:
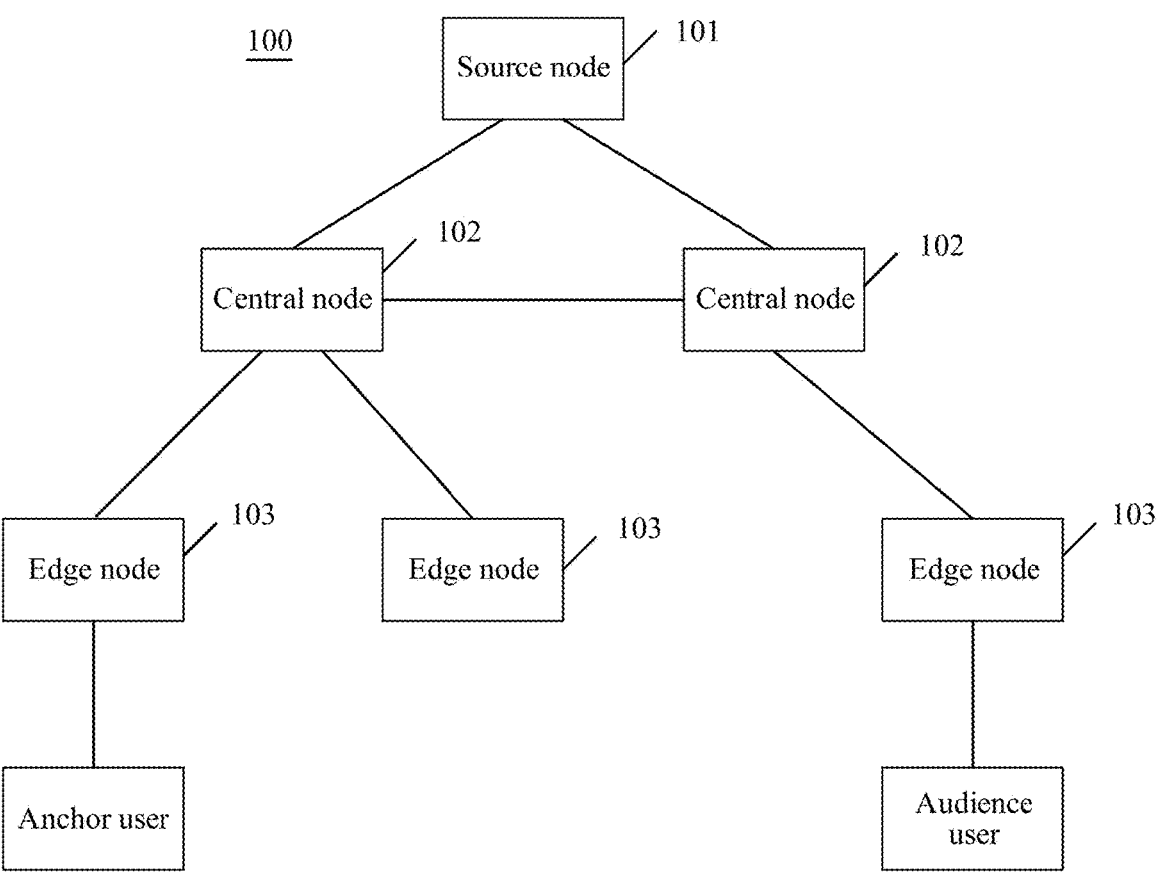
FIG. 1 is a diagram of a structure of a content delivery network according to an embodiment of this disclosure.

Refer to a content delivery network 100 shown in FIG. 1. The content delivery network 100 includes a source node 101, a central node 102, and an edge node 103. The source node 101 communicates with at least one central node 102, and for each central node 102, the central node 102 communicates with at least one edge node 103.

Edge nodes 103 in the content delivery network 100 are distributed in different places. An anchor user of a live service accesses the edge node 103 of the content delivery network 100, and the anchor user sends a data stream of the live service to the edge node 103.

The edge node 103 is configured to: receive the data stream, and send the data stream to the central node 102 that communicates with the edge node 103.

The central node 102 is configured to: receive the data stream, and send the data stream to the source node 101.

The source node 101 is configured to: receive the data stream, and distribute the data stream to each central node 102 in the content delivery network 100 other than the central node 102. Each central node 102 in the content delivery network 100 may obtain the data stream and cache the data stream.

An audience user of the live service accesses the edge node 103 of the content delivery network 100, and the audience user requests the data stream of the live service from the edge node 103.

If the edge node 103 caches the data stream, the edge node 103 is configured to send the cached data stream to the audience user. If the edge node 103 does not cache the data stream, the edge node 103 is configured to: request the data stream from the central node 102 that communicates with the edge node 103, receive the data stream sent by the central node 102, send the data stream to the audience user, and cache the data stream.

In the content delivery network 100, a data stream of a live service is classified into a cold stream, a warm stream, or a hot stream. The cold stream is a data stream requested by a quantity of audience users that does not exceed a cold stream threshold, the warm stream is a data stream requested by a quantity of audience users that exceeds the cold stream threshold and does not exceed a hot stream threshold, and the hot stream is a data stream requested by a quantity of audience users that exceeds the hot stream threshold, where the hot stream threshold is greater than the cold stream threshold.

The hot stream threshold and/or the cold stream threshold are/is thresholds defined by the content delivery network 100. The hot stream threshold and/or the cold stream threshold defined by the content delivery network 100 may be different in different time periods, that is, the hot stream threshold and/or the cold stream threshold are/is not fixed.

In different time periods, a total quantity of edge nodes included in the content delivery network 100 may be different. In other words, in different time periods, edge nodes 103 included in the content delivery network 100 may be increased, or edge nodes 100 included in the content delivery network 100 may be reduced.

The anchor user and the audience user of the live service may be two clients with different functions of the live service. The anchor user may be an anchor client, and the audience user may be an audience client.

Figure 2:
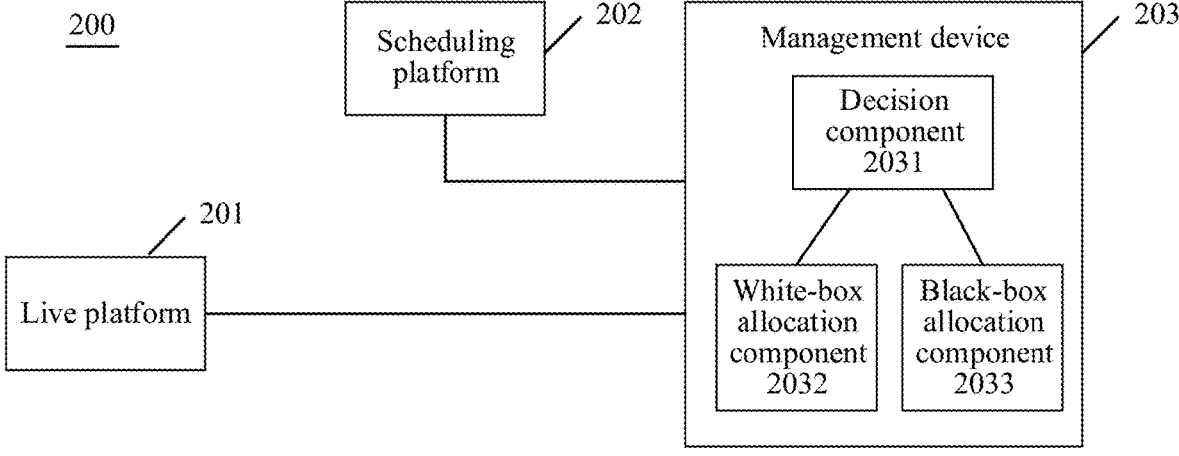
FIG. 2 is a diagram of a structure of a network architecture according to an embodiment of this disclosure.

Refer to FIG. 2. An embodiment of this application provides a network architecture 200. The network architecture 200 includes a live platform 201, a scheduling platform 202, and a management device 203. The management device 203 separately communicates with the live platform 201 and the scheduling platform 202.

The scheduling platform 202 and the management device 203 belong to an operator of the content delivery network 100. The scheduling platform 202 is configured to obtain network information of the content delivery network 100 in a first time period. The network information includes, for example, one or more of a total quantity of edge nodes included in the content delivery network 100 in the first time period, a cold stream threshold of the content delivery network 100 in the first time period, or a hot stream threshold of the content delivery network 100 in the first time period.

The first time period may be a time period after a current time.

The live platform 201 is configured to: apply to a cloud vendor for using the content delivery network 100 to transmit a live service in the first time period, and when applying to use the content delivery network 100 to transmit the live service, send service requirement information of the live service and data stream attribute information of the live service in the first time period to the management device 203.

The management device 203 is configured to: receive the service requirement information and the data stream attribute information, obtain, based on the service requirement information and the data stream attribute information, traffic generated by the live service in the first time period, and allocate a network resource in the content delivery network based on the traffic generated by the live service, so that a data stream of the live service is transmitted in the content delivery network in the first time period based on the network resource.

The management device 203 may further obtain, based on the traffic, a fee required for transmitting the live service in the content delivery network 100. In this way, the operator of the live service pays a fee to the cloud vendor based on the fee obtained by the management device 200.

The first time period may be one week, one month, two months, half a year, or the like. For example, assuming that the first time period is one month, the live platform 201 may apply to the cloud vendor at the end of each month for using the content delivery network 100 to transmit the live service in a next month. The first time period is the next month.

In some embodiments, the management device 203 may be configured to: obtain network information of the content delivery network 100 in the first time period from the scheduling platform 202, and obtain, based on the network information, the service requirement information, and the data stream attribute information, traffic generated by the live service in the first time period.

The traffic generated by the live service in the first time period includes retrieval traffic and output traffic that are generated by the live service in the first time period. The retrieval traffic is traffic generated by data streams sent by the central node included in the content delivery network 100 to the edge node included in the content delivery network 100, that is, the retrieval traffic is equal to a sum of data amounts of the data streams. The output traffic is traffic generated by data streams sent by the edge node included in the content delivery network 100 to the audience user of the live service, that is, the output traffic is equal to a sum of data amounts of the data streams. A ratio of the retrieval traffic to the output traffic is referred to as a retrieval rate.

For example, refer to FIG. 3. The content delivery network 100 includes a central node A, a central node B, an edge node 1 and an edge node 2 communicating with the central node A, and an edge node 3 communicating with the central node B. An audience user 1 and an audience user 2 access the edge node 1, and request to obtain a data stream 1 from the edge node 1. The data stream 1 is a data stream sent by the central node A and received by the edge node 1.

An audience user 3 and an audience user 4 access the edge node 2, and request to obtain a data stream 2 from the edge node 2. The data stream 2 is a data stream sent by the central node A and received by the edge node 2. An audience user 5 access the edge node 3, and request to obtain a data stream 3 from the edge node 3. The data stream 3 is a data stream sent by the central node B and received by the edge node 3.

It is assumed that a data amount of the data stream 1, a data amount of the data stream 2, and a data amount of the data stream 3 are all 2M. In this case, the retrieval traffic is equal to a sum of a data amount of the data stream 1 received by the edge node 1, a data amount of the data stream 2 received by the edge node 2, and a data amount of the data stream 3 received by the edge node 3, that is, the retrieval traffic is equal to 6M. The output traffic is equal to a sum of a data amount of the data stream 1 sent by the edge node 1 to the audience user 1, a data amount of the data stream 1 sent by the edge node 1 to the audience user 2, a data amount of the data stream 2 sent by the edge node 2 to the audience user 3, a data amount of the data stream 2 sent by the edge node 2 to the audience user 4, and a data amount of the data stream 3 sent by the edge node 3 to the audience user 5, that is, the output traffic is equal to 10M. The retrieval rate is equal to the ratio of the retrieval traffic to the output traffic, that is, the retrieval rate is equal to 0.6.

The management device 203 includes a first price corresponding to the output traffic and a second price corresponding to the retrieval traffic. The management device 203 obtains, based on the output traffic, the retrieval traffic, the first price, and the second price, the fee required for transmitting the live service in the content delivery network 100.

The management device 203 includes two network resource allocation manners. The two allocation manners include a white-box allocation manner and a black-box allocation manner. When receiving the service requirement information and the data stream attribute information of the live service, the management device 203 selects an allocation manner based on the service requirement information and the data stream attribute information of the live service, and obtains, by using the selected allocation manner, the traffic generated when the content delivery network 100 transmits the live service.

The white-box allocation manner is a manner of obtaining the traffic based on a first mapping relationship included in the management device 203. For a detailed implementation process of the white-box allocation manner, refer to a method 400 shown in FIG. 4. Details are not described herein.

The first mapping relationship is used to store a mapping relationship between a range of a quantity of audience users, a data amount of a standard data stream, and a quantity of standard edge nodes. The first mapping relationship defines a plurality of stream types, and each stream type corresponds to a different quantity of audience users. The first mapping relationship includes a record corresponding to each stream type, a plurality of stream types are in one-to-one correspondence with a plurality of ranges of quantities of audience users, and each stream type corresponds to a different range of a quantity of audience users. The plurality of stream types include a first stream type, and a quantity of audience users requesting a data stream of the first stream type is in a range of a quantity of audience users corresponding to the first stream type. A record corresponding to the first stream type includes a range of a quantity of audience users, a quantity of standard data streams, and a quantity of standard edge nodes that correspond to the first stream type.

The quantity of standard data streams corresponding to the first stream type indicates a quantity of data streams of the first stream type that are obtained by the edge node of the content delivery network from the central node of the content delivery network. The quantity of standard edge nodes corresponding to the first stream type indicates an average quantity of edge nodes requesting each data stream of the first stream type. Values included in the record corresponding to the first stream type are all baseline values.

Refer to the first mapping relationship shown in Table 1. A record corresponding to a stream type 1 includes a range of a quantity of audience users "[1, 3)", a quantity of standard data streams "103246", and a quantity of standard edge nodes "2.1". The range of the quantity of audience users "[1, 3)" indicates that a quantity of audience users requesting each data stream of the stream type 1 is greater than or equal to 1 and less than 3. The quantity of standard data streams "103246" indicates that the edge node of the content delivery network requests 103246 data streams of the stream type 1 from the central node of the content delivery network. The quantity of standard edge nodes "2.1" indicates that an average quantity of edge nodes requesting each data stream of the stream type 1 is 2.1. Meanings of other records in the first mapping relationship shown in Table 1 are not described one by one.

TABLE 1

| Stream type | Range of a quantity of audience users | Quantity of standard data streams | Quantity of standard edge nodes |
|---|---|---|---|
| Stream type 1 | [1, 3) | 103246 | 2.1 |
| Stream type 2 | [3, 5) | 32306 | 3.9 |
| Stream type 3 | [5, 7) | 15620 | 5.2 |
| Stream type 4 | [7, 9) | 8939 | 5.9 |
| Stream type 5 | [9, 13) | 5468 | 6.7 |
| Stream type 6 | [13, 20) | 11156 | 8.7 |
| . . . | . . . | . . . | . . . |

A data stream of a live service is classified into three main types based on a cold stream threshold and a hot stream threshold: a cold stream, a warm stream, and a hot stream. In the first mapping relationship, the data stream of the live service is divided into a plurality of stream types based on a quantity of requested audience users, and the plurality of stream types are subtypes of the main type. The plurality of stream types include a first stream type. If an upper limit value of a range of a quantity of audience users corresponding to the first stream type does not exceed the cold stream threshold, the first stream type is a subtype of the cold stream. If a lower limit value of the range of the quantity of audience users corresponding to the first stream type exceeds the cold stream threshold and the upper limit value of the range of the quantity of audience users corresponding to the first stream type does not exceed the hot stream threshold, the first stream type is a subtype of the warm stream. If the lower limit value of the range of the quantity of audience users corresponding to the first stream type exceeds the hot stream threshold, the first stream type is a subtype of the hot stream.

The black-box allocation manner is a manner of obtaining the traffic based on a retrieval rate prediction model included in the management device 203, and the retrieval rate prediction module is an intelligent model obtained by the management device 203 through pre-training. For a detailed implementation process of the black-box allocation manner, refer to a method 600 shown in FIG. 6. Details are not described herein.

Refer to FIG. 2. The management device 203 includes a decision component 2031, a white-box allocation component 2032, and a black-box allocation component 2033. Optionally, the management device 203 may be a computing device cluster, and the decision component 2031, the white-box allocation component 2032, and the black-box allocation component 2033 may be different computing devices. Alternatively, the management device 203 may be a computing device, and the decision component 2031, the white-box allocation component 2032, and the black-box allocation component 2033 may be different modules of the computing device.

The decision component 2031 is configured to: select an allocation manner based on the service requirement information and the data stream attribute information of the live service, trigger the white-box allocation component 2032 when selecting the white-box allocation manner, and trigger the black-box allocation component 2033 when selecting the black-box allocation manner.

The white-box allocation component 2032 is configured to obtain, in the white-box allocation manner under triggering of the decision component 2031, the traffic generated when the content delivery network transmits the live service.

The black-box allocation component 2033 is configured to obtain, in the black-box allocation manner under triggering of the decision component 2031, the traffic generated when the content delivery network transmits the live service.

Refer to FIG. 4. An embodiment of this disclosure provides a network resource allocation method 400. The method 400 is applied to the network architecture 200 shown in FIG. 2, and the method 400 is performed by the management device in the network architecture 200. The method 400 uses a white-box allocation manner as an allocation manner, and includes a procedure of steps 401 to 404.

Step 401: The management device receives service requirement information of a live service and data stream attribute information of the live service in a first time period, where the service requirement information includes output traffic that needs to be generated by the live service in the first time period, the data stream attribute information includes a first ratio among a plurality of data streams of the live service, the plurality of data streams include at least two of a cold stream, a warm stream, and a hot stream, and the first time period is later than a current time.

The service requirement information may further include other information. For example, the service requirement information may further include a total quantity of data streams that needs to be sent by an anchor user of the live service to a central node of a content delivery network in the first time period. Therefore, the service requirement information is used to describe a status of transmitting the data stream of the live service in the content delivery network in the first time period.

In step 401, the management device receives an application request sent by a live platform. The application request includes the service requirement information of the live service and the data stream attribute information of the live service in the first time period, and the application request is used to request the management device to allocate a network resource required for transmitting the live service in the content delivery network in the first time period.

The management device may further obtain network information of the content delivery network from a scheduling platform. The network information includes one or more of the following: a total quantity of edge nodes included in the content delivery network in the first time period, a cold stream threshold of the content delivery network in the first time period, a hot stream threshold of the content delivery network in the first time period, or the like. The cold stream threshold is less than the hot stream threshold.

In some embodiments, the management device receives the network information of the content delivery network sent by the scheduling platform.

If network information of the content delivery network in the first time period is the same as network information of the content delivery network in a second time period, the scheduling platform may not send the network information of the content delivery network to the management device, or may continue to send the network information of the content delivery network to the management device. The second time period is a previous time period of the first time period. If the network information of the content delivery network in the first time period is different from the network information of the content delivery network in the second time period, the scheduling platform sends the network information of the content delivery network to the management device.

Step 402: When service requirement information historically received by the management device does not include the service requirement information of the live service and/or data stream attribute information historically received by the management device does not include the data stream attribute information of the live service, the management device obtains, based on the first ratio, a retrieval rate corresponding to the live service in the first time period.

In step 402, when the service requirement information historically received by the management device does not include the service requirement information of the live service, the data stream attribute information historically received by the management device does not include the data stream attribute information of the live service, and/or network information historically received by the management device does not include the network information of the content delivery network, the management device obtains, based on the first ratio, the retrieval rate corresponding to the live service in the first time period.

In step 402, when the service requirement information further includes a total quantity of data streams, the management device obtains, based on the total quantity of data streams and the first ratio, the retrieval rate corresponding to the live service in the first time period.

Figure 5:
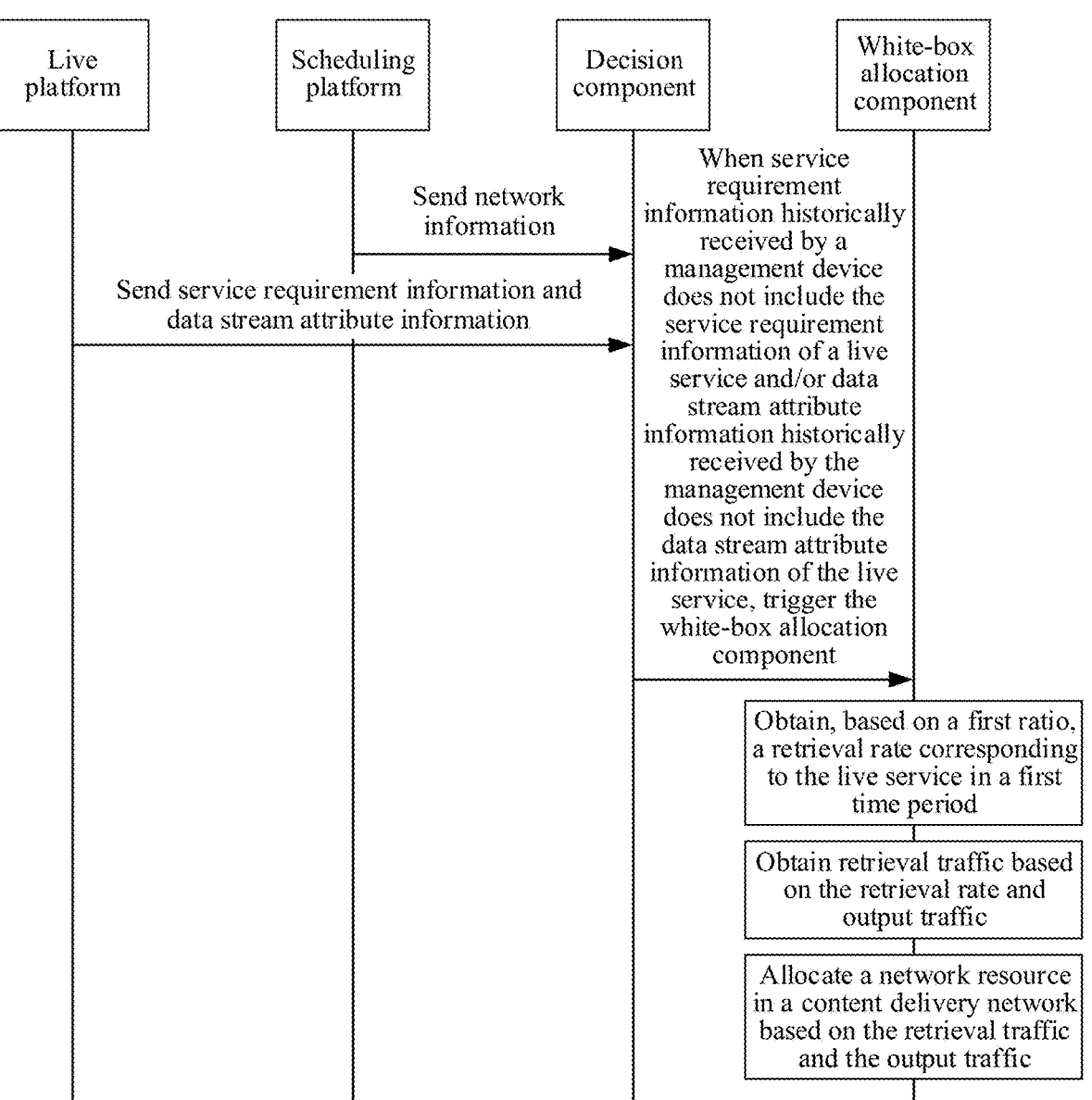
FIG. 5 is a flowchart of another network resource allocation method according to an embodiment of this disclosure.

In step 402, the management device obtains, by using the following procedure, the retrieval rate corresponding to the live service in the first time period. The procedure includes the following operations 4021 to 4023. Optionally, refer to FIG. 5. The decision component included in the management device receives the service requirement information and the data stream attribute information of the live service, and when the service requirement information historically received by the management device does not include the service requirement information of the live service and/or the data stream attribute information historically received by the management device does not include the data stream attribute information of the live service, triggers the white-box allocation component of the management device to perform the following operations 4021 to 4023 to obtain the retrieval rate.

4021: The management device obtains, based on a quantity of standard data streams corresponding to each of a plurality of stream types, a standard ratio of the live service, and the first ratio, a quantity of target data streams corresponding to each stream type in the first time period, where the plurality of stream types include a first stream type, a quantity of target data streams corresponding to the first stream type is a quantity of data streams of the first stream type that the edge node of the content delivery network requests the central node of the content delivery network to send, and the standard ratio is a ratio of at least two of the cold stream, the warm stream, and the hot stream.

The management device includes a first mapping relationship and the standard ratio and the first mapping relationship includes a quantity of standard data streams corresponding to each stream type. The standard ratio of the cold stream, the warm stream, and the hot stream of the live service is represented as $Rc0:Rw0:Rh0$, and the first ratio of the cold stream, the warm stream, and the hot stream of the live service is represented as $Rc:Rw:Rh$.

In 4021, a main type to which the first stream type belongs is determined based on the cold stream threshold and the hot stream threshold of the content delivery network and a range of a quantity of audience users corresponding to the first stream type in the first mapping relationship, that is, it is determined that the data stream of the first stream type is a cold stream, a warm stream, or a hot stream. If the main type of the first stream type is a cold stream, the quantity of target data streams corresponding to the first stream type is equal to $S*Rc/Rc0$, where $S$ is a quantity of standard data streams corresponding to the first stream type. If the main type of the first stream type is a warm stream, the quantity of target data streams corresponding to the first stream type is equal to $S*Rw/Rw0$. If the main type of the first stream type is a hot stream, the quantity of target data streams corresponding to the first stream type is equal to $S*Rh/Rh0$.

A first instance is listed below. The management device in the first instance includes a first mapping relationship shown in Table 2. It is determined, based on the cold stream threshold and the hot stream threshold of the content delivery network and a range of a quantity of audience users corresponding to each stream type in Table 2, that a main type of a stream type 1 and a main type of a stream type 2 are cold streams, a main type of a stream type 3 and a main type of a stream type 4 are warm streams, and a main type of a stream type 5 and a main type of a stream type 6 are hot streams. Refer to Table 3. It is learned, based on $Rc0$, $Rc$, and a quantity $S1$ of standard data streams corresponding to the stream type 1, that a quantity of target data streams corresponding to the stream type 1 is $S1*Rc/Rc0$, and similarly, a quantity of target data streams corresponding to the stream type 2 is $S2*Rc/Rc0$. It is learned, based on $Rw0$, $Rw$, and a quantity $S3$ of standard data streams corresponding to the stream type 3, that a quantity of target data streams corresponding to the stream type 3 is $S3*Rw/Rw0$, and similarly, a quantity of target data streams corresponding to the stream type 4 is $S4*Rw/Rw0$. It is learned, based on $Rh0$, $Rh$, and a quantity $S5$ of standard data streams corresponding to the stream type 5, that a quantity of target data streams corresponding to the stream type 5 is $S5*Rh/Rh0$, and similarly, a quantity of target data streams corresponding to the stream type 6 is $S6*Rh/Rh0$.

TABLE 2

| Stream type | Range of a quantity of audience users | Quantity of standard data streams | Quantity of standard edge nodes |
| --- | --- | --- | --- |
| Stream type 1 | Range 1 of a quantity of audience users | S1 | K1 |

TABLE 2-continued

| Stream type | Range of a quantity of audience users | Quantity of standard data streams | Quantity of standard edge nodes |
|---|---|---|---|
| Stream type 2 | Range 2 of a quantity of audience users | S2 | K2 |
| Stream type 3 | Range 3 of a quantity of audience users | S3 | K3 |
| Stream type 4 | Range 4 of a quantity of audience users | S4 | K4 |
| Stream type 5 | Range 5 of a quantity of audience users | S5 | K5 |
| Stream type 6 | Range 6 of a quantity of audience users | S6 | K6 |
| . . . | . . . | . . . | . . . |

TABLE 3

| Stream type | Range of a quantity of audience users | Quantity of target data streams | Quantity of standard edge nodes |
|---|---|---|---|
| Stream type 1 | Range 1 of a quantity of audience users | S1*Rc/Rc0 | K1 |
| Stream type 2 | Range 2 of a quantity of audience users | S2*Rc/Rc0 | K2*x |
| Stream type 3 | Range 3 of a quantity of audience users | S3*Rw/Rw0 | K3 |
| Stream type 4 | Range 4 of a quantity of audience users | S4*Rw/Rw0 | K4 |
| Stream type 5 | Range 5 of a quantity of audience users | S5*Rh/Rh0 | K5*y |
| Stream type 6 | Range 6 of a quantity of audience users | S6*Rh/Rh0 | K6 |
| . . . | . . . | . . . | . . . |

In step 4021, the management device includes a total quantity of standard data streams of the live service. If the service requirement information further includes a total quantity of data streams, the management device obtains, based on the quantity of standard data streams corresponding to each stream type, the standard ratio, the first ratio, total data of the data streams, and the total quantity of standard data streams, the quantity of target data streams corresponding to each stream type in the first time period.

For example, the plurality of stream types include the first stream type. If the main type of the first stream type is a cold stream, the quantity of target data streams corresponding to the first stream type is equal to $S*Q*Rc/(Q0*Rc0)$, where S is a quantity of standard data streams corresponding to the first stream type, Q is a total quantity of data streams, and Q0 is a total quantity of standard data streams. If the main type of the first stream type is a warm stream, the quantity of target data streams corresponding to the first stream type is equal to $S*Q*Rw/(Q0*Rw0)$. If the main type of the first stream type is a hot stream, the quantity of target data streams corresponding to the first stream type is equal to $S*Q*Rh/(Q0*Rh0)$.

A second instance is listed below. The management device in the second instance includes a first mapping relationship shown in Table 2. It is determined, based on the cold stream threshold and the hot stream threshold of the content delivery network and a range of a quantity of audience users corresponding to each stream type in Table 2, that a main type of a stream type 1 and a main type of a stream type 2 are cold streams, a main type of a stream type 3 and a main type of a stream type 4 are warm streams, and a main type of a stream type 5 and a main type of a stream type 6 are hot streams. Refer to Table 4. It is learned, based on Rc0, Rc, Q, Q0, and a quantity S1 of standard data streams corresponding to the stream type 1, that a quantity of target data streams corresponding to the stream type 1 is $S1*Q*Rc/(Q0*Rc0)$, and similarly, a quantity of target data streams corresponding to the stream type 2 is $S2*Q*Rc/(Q0*Rc0)$. It is learned, based on Rw0, Rw, Q, Q0, and a quantity S3 of standard data streams corresponding to the stream type 3, that a quantity of target data streams corresponding to the stream type 3 is $S3*Q*Rw/(Q0*Rw0)$, and similarly, a quantity of target data streams corresponding to the stream type 4 is $S4*Q*Rw/(Q0*Rw0)$. It is learned, based on Rh0, Q, Q0, Rh, and a quantity S5 of standard data streams corresponding to the stream type 5, that a quantity of target data streams corresponding to the stream type 5 is $S5*Q*Rh/(Q0*Rh0)$, and similarly, a quantity of target data streams corresponding to the stream type 6 is $S6*Q*Rh/(Q0*Rh0)$.

TABLE 4

| Stream type | Range of a quantity of audience users | Quantity of target data streams | Quantity of standard edge nodes |
|---|---|---|---|
| Stream type 1 | Range 1 of a quantity of audience users | S1*Q*Rc/(Q0*Rc0) | K1 |
| Stream type 2 | Range 2 of a quantity of audience users | S2*Q*Rc/(Q0*Rc0) | K2*x |
| Stream type 3 | Range 3 of a quantity of audience users | S3*Q*Rw/(Q0*Rw0) | K3 |
| Stream type 4 | Range 4 of a quantity of audience users | S4*Q*Rw/(Q0*Rw0) | K4 |
| Stream type 5 | Range 5 of a quantity of audience users | S5*Q*Rh/(Q0*Rh0) | K5*y |
| Stream type 6 | Range 6 of a quantity of audience users | S6*Q*Rh/(Q0*Rh0) | K6 |
| . . . | . . . | . . . | . . . |

4022: The management device obtains a quantity of target edge nodes corresponding to each stream type in the first time period, where a quantity of target edge nodes corresponding to the first stream type is an average quantity of edge nodes of the data stream of the first stream type.

The first mapping relationship defines the main type of each stream type. In the foregoing operation 4021, the management device determines, based on the cold stream threshold and the hot stream threshold, that the main type of the first stream type is a cold stream, a warm stream, or a hot stream. If the main type of the first stream type changes from a cold stream defined in the first mapping relationship to a warm stream, or changes from a warm stream defined in the first mapping relationship to a hot stream, a quantity of standard edge nodes corresponding to the first stream type is reduced. If the data stream of the first stream type changes from a warm stream defined in the first mapping relationship to a cold stream, or changes from a hot stream defined in the first mapping relationship to a warm stream, a quantity of standard edge nodes corresponding to the first stream type is increased. If the main type of the first stream type is the same as a main type defined in the first mapping relationship, a quantity of standard edge nodes corresponding to the first stream type does not need to be changed.

The network information of the content delivery network in the first time segment includes the total quantity of edge nodes of the content delivery network in the first time period, and the management device includes a total quantity of standard edge nodes. The management device calculates a ratio of the total quantity of edge nodes to the total quantity of standard edge nodes, and multiplies the ratio by a quantity of standard edge nodes corresponding to each stream type, to obtain the quantity of target edge nodes corresponding to each stream type.

In some embodiments, the management device includes a first coefficient greater than 1 and a second coefficient less than 1.

In some embodiments, an operation of increasing, by the management device, the quantity of standard edge nodes corresponding to the first stream type is: calculating a product of the quantity of standard edge nodes corresponding to the first stream type and the first coefficient to obtain a first value, and replacing the quantity of standard edge nodes corresponding to the first stream type that is stored in the first mapping relationship with the first value.

In some embodiments, an operation of increasing, by the management device, the quantity of standard edge nodes corresponding to the first stream type is: calculating a product of the quantity of standard edge nodes corresponding to the first stream type and the second coefficient to obtain a second value, and replacing the quantity of standard edge nodes corresponding to the first stream type that is stored in the first mapping relationship with the second value.

For example, it is assumed that the first coefficient is x, x is greater than 1, the second coefficient is y, and y is less than 1. In the first instance or the second instance listed above, the main type of the stream type 2 changes from a warm stream defined in the first mapping relationship to a cold stream. Refer to Table 3 or Table 4. The management device replaces the quantity of standard edge nodes corresponding to the stream type 2 in Table 2 with K2*x, to increase the quantity of standard edge nodes corresponding to the stream type 2. The main type of the stream type 5 changes from a warm stream defined in the first mapping relationship to a hot stream, and the quantity of standard edge nodes corresponding to the stream type 5 in Table 2 is replaced with K5*y, to reduce the quantity of standard edge nodes corresponding to the stream type 5.

It is assumed that the management device calculates the ratio of the total quantity of edge nodes to the total quantity of standard edge nodes as z. In the first instance listed above, the ratio z is multiplied by the quantity of standard edge nodes corresponding to each stream type in Table 3, to obtain the quantity of target edge nodes corresponding to each stream type. An obtained result is shown in Table 5 below. In the second instance listed above, the ratio z is multiplied by the quantity of standard edge nodes corresponding to each stream type in Table 4, to obtain the quantity of target edge nodes corresponding to each stream type. An obtained result is shown in Table 6 below.

TABLE 5

| Stream type | Range of a quantity of audience users | Quantity of target data streams | Quantity of target edge nodes |
|---|---|---|---|
| Stream type 1 | Range 1 of a quantity of audience users | S1*Rc/Rc0 | K1*z |
| Stream type 2 | Range 2 of a quantity of audience users | S2*Rc/Rc0 | K2*x*z |
| Stream type 3 | Range 3 of a quantity of audience users | S3*Rw/Rw0 | K3*z |

TABLE 5-continued

| Stream type | Range of a quantity of audience users | Quantity of target data streams | Quantity of target edge nodes |
|---|---|---|---|
| Stream type 4 | Range 4 of a quantity of audience users | S4*Rw/Rw0 | K4*z |
| Stream type 5 | Range 5 of a quantity of audience users | S5*Rh/Rh0 | K5*y*z |
| Stream type 6 | Range 6 of a quantity of audience users | S6*Rh/Rh0 | K6*z |
| . . . | . . . | . . . | . . . |

TABLE 6

| Stream type | Range of a quantity of audience users | Quantity of target data streams | Quantity of standard edge nodes |
|---|---|---|---|
| Stream type 1 | Range 1 of a quantity of audience users | S1*Q*Rc/(Q0*Rc0) | K1*z |
| Stream type 2 | Range 2 of a quantity of audience users | S2*Q*Rc/(Q0*Rc0) | K2*x*z |
| Stream type 3 | Range 3 of a quantity of audience users | S3*Q*Rw/(Q0*Rw0) | K3*z |
| Stream type 4 | Range 4 of a quantity of audience users | S4*Q*Rw/(Q0*Rw0) | K4*z |
| Stream type 5 | Range 5 of a quantity of audience users | S5*Q*Rh/(Q0*Rh0) | K5*y*z |
| Stream type 6 | Range 6 of a quantity of audience users | S6*Q*Rh/(Q0*Rh0) | K6*z |
| . . . | . . . | . . . | . . . |

4023: Obtain, based on a standard retrieval rate, the quantity of target data streams and the quantity of target edge nodes that correspond to each stream type, and the quantity of standard data streams and the quantity of standard edge nodes that correspond to each stream type, the retrieval rate corresponding to the live service in the first time period.

In 4023, the retrieval rate corresponding to the live service in the first time period is obtained by using the following first formula based on the standard retrieval rate, the quantity of target data streams and the quantity of target edge nodes that correspond to each stream type, and the quantity of standard data streams and the quantity of standard edge nodes that correspond to each stream type:

$$\text{First formula:} \begin{cases} C = \dfrac{\sum\limits_{i=1}^{M} \text{stream}_i * \text{node}_i}{\sum\limits_{i=1}^{M} \text{Stream}_i * \text{Node}_i} . \\ E = E_0 * C \end{cases}$$

In the first formula, M is a total quantity of stream types, $\text{stream}_i$ is a quantity of target data streams corresponding to the $i^{th}$ stream type, $\text{node}_i$ is a quantity of target edge nodes corresponding to the $i^{th}$ stream type, $\text{Stream}_i$ is a quantity of standard data streams corresponding to the $i^{th}$ stream type, $\text{Node}_i$ is a quantity of standard edge nodes corresponding to the $i^{th}$ stream type, C is a retrieval rate change multiple, $E_0$ is the standard retrieval rate defined in the first mapping relationship, and E is the retrieval rate corresponding to the live service in the first time period.

Step 403: The management device obtains retrieval traffic based on the retrieval rate and the output traffic.

In step 403, the management device multiplies the retrieval rate by the output traffic, to obtain the retrieval traffic.

Step 404: The management device allocates a network resource in the content delivery network based on the retrieval traffic and the output traffic.

In step 404, the management device allocates, based on the retrieval traffic, a network resource between the central node of the content delivery network and the edge node of the content delivery network, where the network resource includes a bandwidth resource and the like. In this way, the content delivery network reserves the allocated network resource, and the network resource is used to transmit a data stream that the edge node requests to send to the central node.

The management device allocates a network resource of the edge node of the content delivery network based on the output traffic, where the network resource includes a bandwidth resource and the like. In this way, the content delivery network reserves the allocated network resource, and the network resource is used to transmit a data stream that is requested by an audience user of the live service and sent by the edge node to the audience user.

In step 404, the management device may further obtain a fee required for transmitting the live service in the content delivery network in the first time period.

The management device includes a first price corresponding to the output traffic and a second price corresponding to the retrieval traffic. The management device obtains, based on the output traffic, the retrieval traffic, the first price, and the second price, the fee required for transmitting the live service in the content delivery network.

In some embodiments, when the retrieval rate corresponding to the live service is obtained, at least one basic feature is obtained, and the at least one basic feature includes retrieval traffic and the first ratio. The at least one basic feature and the retrieval rate form a training sample. Optionally, the at least one basic feature further includes one or more of the following: the total quantity of edge nodes or the total quantity of data streams.

In some embodiments, at least one derivative feature is obtained based on the at least one basic feature, and the at least one basic feature, the at least one derivative feature, and the retrieval rate form a training sample. Optionally, a detailed implementation process of obtaining the at least one derivative feature is described in detail in a subsequent embodiment, and is not described herein.

In this embodiment of this disclosure, the management device receives the service requirement information of the live service and the data stream attribute information of the live service in the first time period. The management device obtains, based on the first ratio, the retrieval rate corresponding to the live service in the first time period, obtains, based on the retrieval rate and the output traffic included in the service requirement information, the retrieval traffic generated by the live service in the first time period, and allocates the network resource in the content delivery network based on the retrieval traffic and the output traffic. Because the data stream attribute information of the live service is obtained, and the retrieval traffic the output traffic that are generated by the live service in the first time period are obtained based on the service attribute information and the service requirement information of the live service, traffic is obtained with reference to a data stream attribute of the live service. Data stream attributes of the live service in different time periods may be different, different data stream attributes have different impact on retrieval traffic, and a network resource is allocated based on retrieval traffic and output traffic in different time periods, thereby improving flexibility of allocating the network resource. In addition, a fee required for transmitting the live service in the content delivery network is obtained based on the retrieval traffic and the output traffic in different time periods, thereby improving charging flexibility. In addition, when the service requirement information historically received by the management device does not include the service requirement information of the live service and/or the data stream attribute information historically received by the management device does not include the data stream attribute information of the live service, the management device obtains, based on the first ratio, the retrieval rate corresponding to the live service in the first time period, thereby improving precision of obtaining the retrieval rate.

Refer to FIG. 6. An embodiment of this disclosure provides a network resource allocation method 600. The method 600 is applied to the network architecture 200 shown in FIG. 2, and the method 600 is performed by the management device in the network architecture 200. The method 600 uses a black-box allocation manner as an allocation manner, and includes a procedure of steps 601 to 604.

Step 601: This step is the same as step 401 in the method 400 shown in FIG. 4, and is not described in detail herein again.

Step 602: When service requirement information historically received by the management device includes the service requirement information of the live service and data stream attribute information historically received by the management device includes the data stream attribute information of the live service, the management device obtains, based on the retrieval traffic, the first ratio, and a retrieval rate prediction module, a retrieval rate corresponding to the live service in the first time period.

Figure 7:
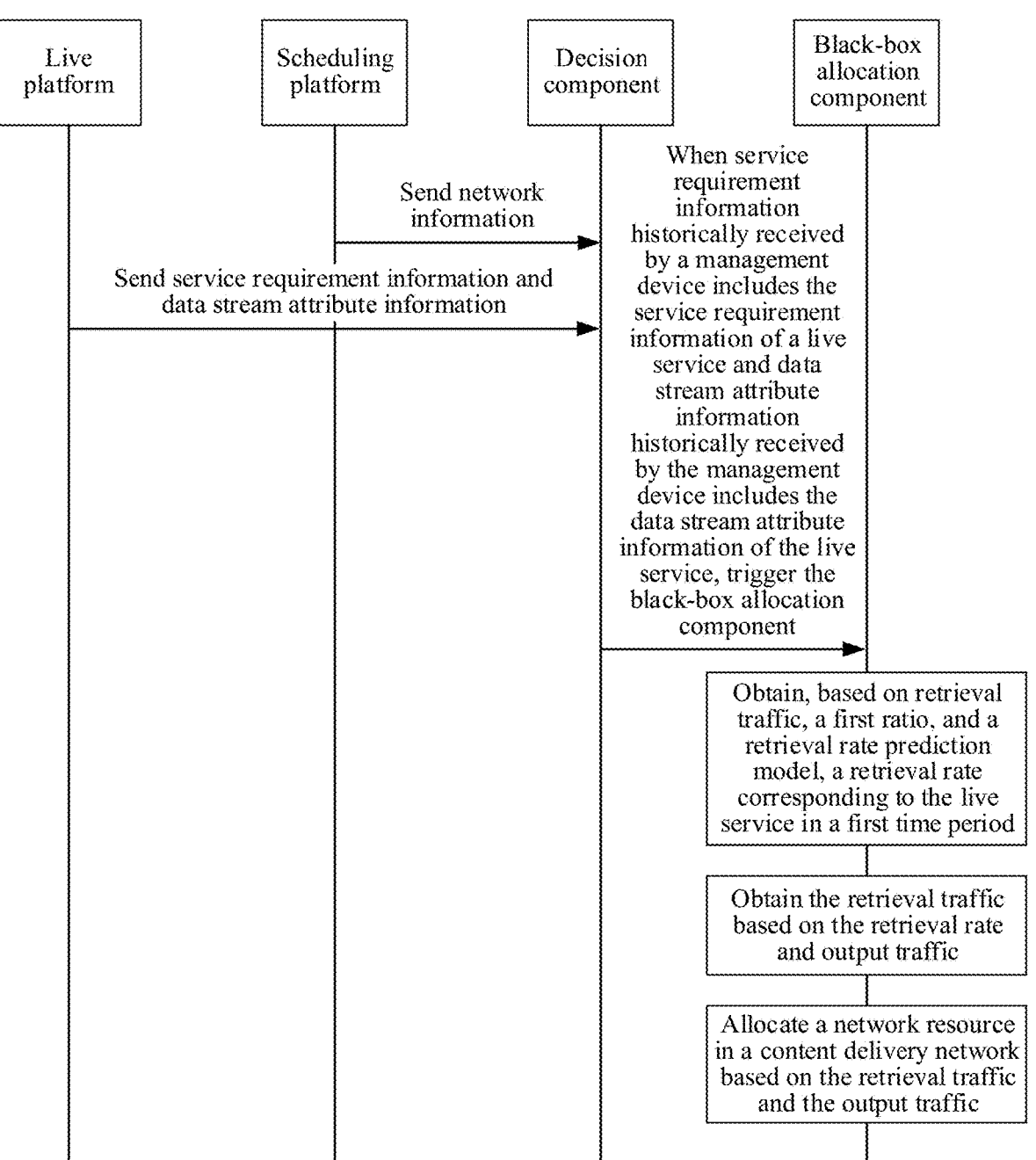
FIG. 7 is a flowchart of another network resource allocation method according to an embodiment of this disclosure.

Refer to FIG. 7: The decision component included in the management device receives the service requirement information and the data stream attribute information of the live service, when the service requirement information historically received by the management device includes the service requirement information of the live service and the data stream attribute information historically received by the management device includes the data stream attribute information of the live service, the black-box allocation component in the management device is triggered to obtain, based on the retrieval traffic, the first ratio, and the retrieval rate prediction module, the retrieval rate corresponding to the live service in the first time period.

In step 602, when the service requirement information historically received by the management device includes the service requirement information of the live service, the data stream attribute information historically received by the management device includes the data stream attribute information of the live service, and network information historically received by the management device includes the network information of the content delivery network, the management device obtains, based on the retrieval traffic, the first ratio, and the retrieval rate prediction module, the retrieval rate corresponding to the live service in the first time period.

In some embodiments, when the service requirement information further includes a total quantity of data streams, the management device obtains, based on the total quantity of data streams, the retrieval traffic, the first ratio, and the retrieval rate prediction module, the retrieval rate corresponding to the live service in the first time period.

In some embodiments, when the management device receives the network information of the content delivery network, the network information includes a total quantity of edge nodes included in the content delivery network in the first time period, and the management device may obtain, based on the total quantity of edge nodes, the total quantity of data streams, the retrieval traffic, the first ratio, and the retrieval rate prediction model, the retrieval rate corresponding to the live service in the first time period.

In step 602, the management device obtains, in the following manner 1 and manner 2, the retrieval rate corresponding to the live service in the first time period. The following describes the manner 1 and the manner 2 in detail.

Manner 1: The management device obtains at least one basic feature, where the at least one basic feature includes the retrieval traffic and the first ratio; inputs the at least one basic feature into the retrieval rate prediction model, so that the retrieval rate prediction model obtains, based on the at least one basic feature, the retrieval rate corresponding to the live service in the first time period; and obtains the retrieval rate output by the retrieval prediction model.

In some embodiments, the at least one basic feature further includes one or more of the following: the total quantity of edge nodes or the total quantity of data streams.

Manner 2: The management device obtains at least one basic feature, where the at least one basic feature includes the retrieval traffic and the first ratio; obtains at least one derivative feature based on the at least one basic feature; inputs the at least one basic feature and the at least one derivative feature into the retrieval rate prediction model, so that the retrieval rate prediction model obtains, based on the at least one basic feature and the at least one derivative feature, the retrieval rate corresponding to the live service in the first time period; and obtains the retrieval rate output by the retrieval prediction model.

In some embodiments, the at least one basic feature further includes one or more of the following: the total quantity of edge nodes or the total quantity of data streams.

The at least one derivative feature includes one or more of the following: a total quantity of audience users of the live service in the first time period, an average quantity of audience users corresponding to the data stream sent by the anchor user of the live service, average output traffic corresponding to the data stream sent by the anchor user of the live service, an average quantity of data streams sent by the edge node in the first time period, an average quantity of audience users requesting the data stream from the edge node in the first time period, or average output traffic sent by the edge node in the first time period.

The following lists an implementation instance of obtaining, by the management device, the at least one derivative feature. Certainly, there are other implementation instances of obtaining the at least one derivative feature, which are not listed one by one herein. The implementation instance is as follows:

In some embodiments, the total quantity of audience users is obtained based on the output traffic and a standard data amount of the data stream of the live service. The standard data amount is a fixed value. Optionally, the total quantity of audience users is equal to a ratio of the output traffic to the standard data amount.

In some embodiments, the average quantity of audience users is obtained based on the total quantity of audience users and the total quantity of data streams. Optionally, the average quantity of audience users is equal to a ratio of the total quantity of audience users to the total quantity of data streams.

In some embodiments, the average output traffic is obtained based on the output traffic and the total quantity of data streams. Optionally, the average output traffic is equal to a ratio of the output traffic to the total quantity of data streams.

In some embodiments, the average quantity of data streams is obtained based on the total quantity of data streams and the total quantity of edge nodes. Optionally, the average quantity of data streams is equal to a ratio of the total quantity of data streams to the total quantity of edge nodes.

In some embodiments, the average quantity of audience users is obtained based on the total quantity of audience users and the total quantity of edge nodes. Optionally, the average quantity of audience users is equal to a ratio of the total quantity of audience users to the total quantity of edge nodes.

In some embodiments, the average output traffic is obtained based on the output traffic and the total quantity of edge nodes. Optionally, the average output traffic is equal to a ratio of the output traffic to the total quantity of edge nodes.

The retrieval rate prediction model is obtained through training in advance. The training process is: obtaining the retrieval rate prediction model based on at least one training sample, where each training sample includes historically obtained retrieval traffic of the live service, a historically obtained ratio of a cold stream, a warm stream, and a hot stream of the live service, and a retrieval rate obtained based on the historically obtained retrieval traffic and the ratio.

In other words, each training sample includes at least one basic feature and a retrieval rate corresponding to the at least one basic feature, or each training sample includes at least one basic feature, at least one derivative feature, and a retrieval rate corresponding to the at least one basic feature and the at least one derivative feature.

In some embodiments, the retrieval rate prediction model is obtained based on the at least one training sample by performing the following operations 6021 to 6023.

6021: Identify, based on the at least one training sample and a to-be-trained retrieval rate prediction model, a retrieval rate corresponding to each training sample.

For any training sample, at least one basic feature included in the training sample is input into the to-be-trained retrieval rate prediction model, so that the to-be-trained retrieval rate prediction model obtains a retrieval rate based on the at least one basic feature, obtains the retrieval rate output by the to-be-trained retrieval rate prediction model, and uses the retrieval rate as a retrieval rate corresponding to the training sample; or at least one basic feature and at least one derivative feature included in the training sample is input into the to-be-trained retrieval rate prediction model, so that the to-be-trained retrieval rate prediction model obtains a retrieval rate based on the at least one basic feature and the at least one derivative feature, obtains the retrieval rate output by the to-be-trained retrieval rate prediction model, and uses the retrieval rate as a retrieval rate corresponding to the training sample.

6022: Calculate a loss value by using a loss function based on a retrieval rate included in each training sample and the retrieval rate corresponding to each training sample, and adjust a parameter of the to-be-trained retrieval rate prediction model based on the loss value.

6023: Determine whether to continue training the to-be-trained retrieval rate prediction model; and if it is determined to continue training the to-be-trained retrieval rate prediction model, return to step 6021; or if it is determined not to continue training the to-be-trained retrieval rate prediction model, use the to-be-trained retrieval rate prediction model as the retrieval rate prediction model.

In some embodiments, when a quantity of times of training the to-be-trained retrieval rate prediction model reaches a specified quantity of times, it is determined not to continue training the to-be-trained retrieval rate prediction model; or precision of obtaining a retrieval rate by the to-be-trained retrieval rate prediction model is obtained by using a plurality of verification samples, and when the precision exceeds a specified threshold, it is determined not to continue training the to-be-trained retrieval rate prediction model. During implementation:

a plurality of verification samples are obtained, where each verification sample includes at least one basic feature and a retrieval rate corresponding to the at least one basic feature, or each verification sample includes at least one basic feature, at least one derivative feature, and a retrieval rate corresponding to the at least one basic feature and the at least one derivative feature. A retrieval rate corresponding to each verification sample is obtained based on the to-be-trained retrieval rate prediction model. Precision of obtaining a retrieval rate is calculated based on a retrieval rate included in each verification sample and the retrieval rate corresponding to each verification sample. When the precision does not exceed a specified threshold, it is determined to continue training the to-be-trained retrieval rate prediction model; or when the precision exceeds the specified threshold, it is determined not to continue training the to-be-trained retrieval rate prediction model.

Figure 8:
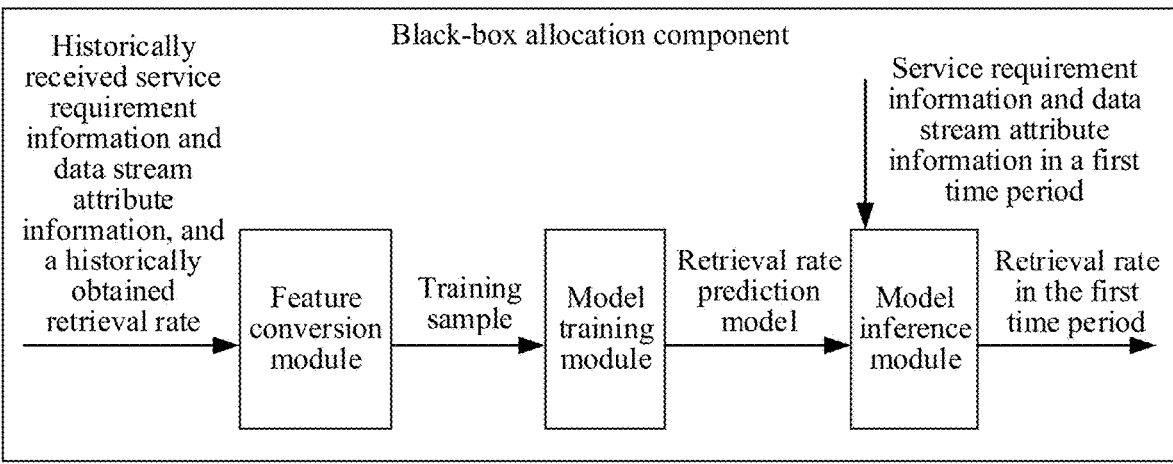
FIG. 8 is a diagram of a structure of a black-box allocation component according to an embodiment of this disclosure.

Refer to FIG. 8. The black-box allocation component includes a feature conversion module, a model training module, and a model inference module. The black-box allocation component inputs the historically received service requirement information and data stream attribute information, and the historically obtained retrieval rate into the feature conversion module. The feature conversion module obtains the training sample based on the service requirement information and the data stream attribute information, and the model training module trains the retrieval rate prediction module based on the training sample. The model inference module obtains the retrieval rate of the live service in the first time period based on the service requirement information, the data stream attribute information, and the retrieval rate prediction model in the first time period.

Step 603: The management device obtains retrieval traffic based on the retrieval rate and the output traffic.

In step 603, the management device multiplies the retrieval rate by the output traffic, to obtain the retrieval traffic.

Step 604: The management device allocates a network resource in the content delivery network based on the retrieval traffic and the output traffic.

For a detailed implementation process of allocating the network resource by the management device, refer to related content in step 404 of the method 400 shown in FIG. 4. Details are not described herein again.

In step 604, the management device may further obtain a fee required for transmitting the live service in the content delivery network in the first time period.

The management device includes a first price corresponding to the output traffic and a second price corresponding to the retrieval traffic. The management device obtains, based on the output traffic, the retrieval traffic, the first price, and the second price, the fee required for transmitting the live service in the content delivery network.

In this embodiment of this disclosure, the management device receives the service requirement information of the live service and the data stream attribute information of the live service in the first time period. The management device obtains, based on the retrieval traffic, the first ratio, and the retrieval rate prediction model, the retrieval rate corresponding to the live service in the first time period, obtains, based on the retrieval rate and the output traffic included in the service requirement information, the retrieval traffic generated by the live service in the first time period, and allocates the network resource in the content delivery network based on the retrieval traffic and the output traffic. Because the data stream attribute information of the live service is obtained, and the retrieval traffic and the output traffic that are generated by the live service in the first time period are obtained based on the service attribute information and the service requirement information of the live service, traffic is obtained with reference to a data stream attribute of the live service. Data stream attributes of the live service in different time periods may be different, thereby improving flexibility of allocating the network resource. In addition, when the service requirement information historically received by the management device includes the service requirement information of the live service and the data stream attribute information historically received by the management device does not include the data stream attribute information of the live service, the management device obtains, based on the retrieval traffic, the first ratio, and the retrieval rate prediction model, the retrieval rate corresponding to the live service in the first time period, thereby improving precision of obtaining the retrieval rate. In addition, the management device obtains the retrieval rate based on the retrieval rate prediction model, thereby improving efficiency of obtaining a retrieval rate, and improving efficiency of allocating the network resource.

Figure 9:
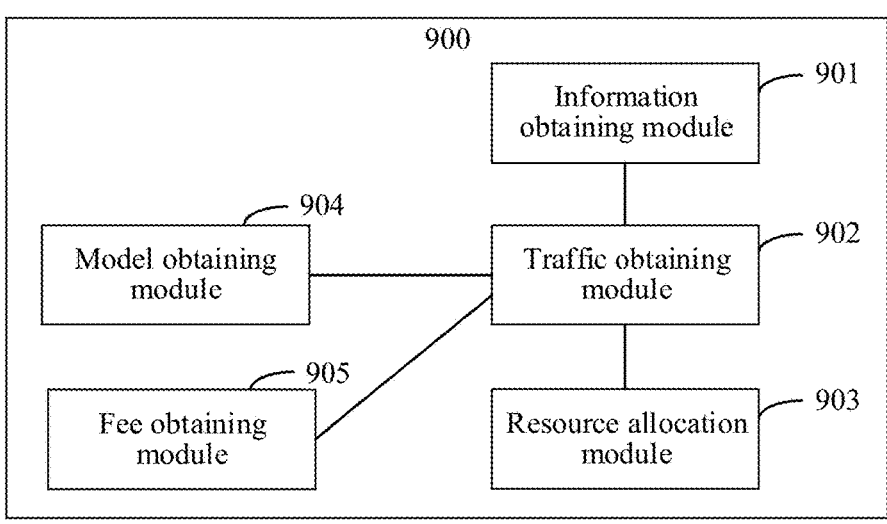
FIG. 9 is a diagram of a structure of a network resource allocation apparatus according to an embodiment of this disclosure.

Refer to FIG. 9. An embodiment of this disclosure provides a network resource allocation apparatus 900. The apparatus 900 is deployed on the management device in the network architecture 200 shown in FIG. 2, the management device in the method 400 shown in FIG. 4, or the management device in the method 600 shown in FIG. 6. The apparatus 900 includes:

an information obtaining module 901, configured to obtain service requirement information of a live service and data stream attribute information of the live service in a first time period, where the service requirement information is used to describe a status of transmitting a data stream of the live service in a content delivery network in the first time period, the first time period is after a current time, the content delivery network includes a central node and an edge node, the central node is configured to send a data stream from an anchor user of the live service to the edge node, and the edge node is configured to send the data stream to an audience user requesting the data stream;

a traffic obtaining module 902, configured to obtain, based on the service requirement information and the data stream attribute information, retrieval traffic and output traffic that are generated by the live service in the first time period, where the retrieval traffic is traffic generated by sending the data stream by the central node, and the output traffic is traffic generated by sending the data stream by the edge node; and a resource allocation module 903, configured to allocate a network resource in the content delivery network based on the retrieval traffic and the output traffic.

Optionally, for a detailed implementation process of obtaining the service requirement information and the data stream attribute information by the information obtaining module 901, refer to related content in step 401 in the method 400 shown in FIG. 4 and step 601 in the method 600 shown in FIG. 6. Details are not described herein again.

Optionally, for a detailed implementation process of obtaining, by the traffic obtaining module 902, the retrieval traffic and the output traffic that are generated by the live service in the first time period, refer to related content in steps 402 and 403 in the method 400 shown in FIG. 4 and steps 602 and 603 in the method 600 shown in FIG. 6. Details are not described herein again.

Optionally, for a detailed implementation process of allocating the network resource by the resource allocation module 903, refer to related content in step 404 in the method 400 shown in FIG. 4 and step 604 in the method 600 shown in FIG. 6. Details are not described herein again.

Optionally, the service requirement information includes the output traffic, and the data stream attribute information includes a first ratio of a cold stream, a warm stream, and a hot stream included in the live service.

The traffic obtaining module 902 is configured to:

obtain, based on the first ratio, a retrieval rate corresponding to the live service in the first time period, where the retrieval rate is a ratio of the retrieval traffic to the output traffic; and obtain the retrieval traffic based on the retrieval rate and the output traffic.

Optionally, for a detailed implementation process in which the traffic obtaining module 902 obtains, based on the first ratio, the retrieval rate corresponding to the live service in the first time period, refer to related content in step 402 in the method 400 shown in FIG. 4. Details are not described herein again.

Optionally, the cold stream is a data stream requested by a quantity of audience users that does not exceed a cold stream threshold, the warm stream is a data stream requested by a quantity of audience users that exceeds the cold stream threshold and does not exceed a hot stream threshold, and the hot stream is a data stream requested by a quantity of audience users that exceeds the hot stream threshold, where the hot stream threshold is greater than the cold stream threshold.

Optionally, for a detailed implementation process in which the traffic obtaining module 902 obtains the retrieval traffic based on the retrieval rate and the output traffic, refer to related content in step 403 in the method 400 shown in FIG. 4. Details are not described herein again.

Optionally, the service requirement information further includes a total quantity of data streams that need to be sent by the anchor user of the live service to the central node in the first time period.

The traffic obtaining module 902 is configured to obtain, based on the total quantity of data streams and the first ratio, the retrieval rate corresponding to the live service in the first time period.

Optionally, the traffic obtaining module 902 is configured to:

obtain, based on a quantity of standard edge nodes corresponding to each of the plurality of stream types, a quantity of edge nodes corresponding to each stream type in the first time period, where a quantity of audience users requesting a data stream of each stream type is different;

obtain, based on a quantity of standard data streams corresponding to each stream type and the first ratio, a quantity of data streams corresponding to each stream type in the first time period; and obtain, based on the quantity of data streams and the quantity of edge nodes that correspond to each stream type, the retrieval rate corresponding to the live service in the first time period.

Optionally, for a detailed implementation process in which the traffic obtaining module 902 obtains the quantity of edge nodes corresponding to each stream type in the first time period, refer to related content in operation 4022 in the method 400 shown in FIG. 4. Details are not described herein again.

Optionally, for a detailed implementation process in which the traffic obtaining module 902 obtains the quantity of data streams corresponding to each stream type in the first time period, refer to related content in operation 4021 in the method 400 shown in FIG. 4. Details are not described herein again.

Optionally, for a detailed implementation process in which the traffic obtaining module 902 obtains the retrieval rate corresponding to the live service in the first time period, refer to related content in operation 4023 in the method 400 shown in FIG. 4. Details are not described herein again.

Optionally, the information obtaining module 901 is further configured to obtain network information of the content delivery network, where the network information includes one or more of the following: a total quantity of edge nodes included in the content delivery network in the first time period, a cold stream threshold of the content delivery network in the first time period, or a hot stream threshold of the content delivery network in the first time period.

The traffic obtaining module 902 is configured to obtain, based on the network information and the quantity of standard edge nodes corresponding to each stream type, the quantity of edge nodes corresponding to each stream type in the first time period.

Optionally, for a detailed implementation process in which the information obtaining module 901 obtains the network information of the content delivery network, refer to related content in step 401 in the method 400 shown in FIG. 4 and step 601 in the method 600 shown in FIG. 6. Details are not described herein again.

Optionally, for a detailed implementation process in which the traffic obtaining module 902 obtains the quantity of edge nodes corresponding to each stream type in the first time period, refer to related content in step 402 in the method 400 shown in FIG. 4. Details are not described herein again.

Optionally, the traffic obtaining module 902 is configured to: when historically obtained service requirement information does not include the service requirement information of the live service and/or historically obtained data stream attribute information does not include the data stream attribute information of the live service, obtain, based on the first ratio, the retrieval rate corresponding to the live service in the first time period.

Optionally, the service requirement information includes the output traffic, and the data stream attribute information includes a first ratio of a cold stream, a warm stream, and a hot stream included in the live service.

The traffic obtaining module 902 is configured to:

obtain, based on the retrieval traffic, the first ratio, and a retrieval rate prediction model, a retrieval rate corresponding to the live service in the first time period, where the retrieval rate is a ratio of the retrieval traffic to the output traffic; and obtain the retrieval traffic based on the retrieval rate and the output traffic.

Optionally, for a detailed implementation process in which the traffic obtaining module 902 obtains, based on the retrieval traffic, the first ratio, and a retrieval rate prediction model, a retrieval rate corresponding to the live service in the first time period, refer to related content in step 602 in the method 600 shown in FIG. 6. Details are not described herein again.

Optionally, for a detailed implementation process in which the traffic obtaining module 902 obtains the retrieval traffic based on the retrieval rate and the output traffic, refer to related content in step 603 in the method 600 shown in FIG. 6. Details are not described herein again.

Optionally, the service requirement information further includes a total quantity of data streams that need to be sent by the anchor user of the live service to the central node in the first time period.

The traffic obtaining module 902 is configured to obtain, based on the total quantity of data streams, the retrieval traffic, the first ratio, and the retrieval rate prediction model, the retrieval rate corresponding to the live service in the first time period.

Optionally, the traffic obtaining module 902 is configured to:

obtain a total quantity of edge nodes included in the content delivery network in the first time period; and obtain, based on the total quantity of edge nodes, the total quantity of data streams, the retrieval traffic, the first ratio, and the retrieval rate prediction model, the retrieval rate corresponding to the live service in the first time period.

Optionally, the traffic obtaining module 902 is configured to:

obtain, based on the output traffic, the total quantity of data streams, and/or the total quantity of edge nodes, at least one derivative feature corresponding to the live service; and obtain, based on the at least one derivative feature, the total quantity of edge nodes, the total quantity of data streams, the retrieval traffic, the first ratio, and the retrieval rate prediction model, the retrieval rate corresponding to the live service in the first time period.

Optionally, for a detailed implementation process in which the traffic obtaining module 902 obtains at least one derivative feature corresponding to the live service, refer to related content in step 602 in the method 600 shown in FIG. 6. Details are not described herein again.

Optionally, for a detailed implementation process in which the traffic obtaining module 902 obtains, based on the at least one derivative feature, the total quantity of edge nodes, the total quantity of data streams, the retrieval traffic, the first ratio, and the retrieval rate prediction model, the retrieval rate corresponding to the live service in the first time period, refer to related content in step 603 in the method 600 shown in FIG. 6. Details are not described herein again.

Optionally, the at least one derivative feature includes one or more of the following: a total quantity of audience users of the live service in the first time period, an average quantity of audience users corresponding to the data stream sent by the anchor user of the live service, average output traffic corresponding to the data stream sent by the anchor user of the live service, an average quantity of data streams sent by the edge node in the first time period, an average quantity of audience users requesting the data stream from the edge node in the first time period, or average output traffic sent by the edge node in the first time period.

The traffic obtaining module 902 is configured to:

obtain the total quantity of audience users based on the output traffic and a standard data amount of the data stream of the live service; and/or obtain the average quantity of audience users based on the total quantity of audience users and the total quantity of data streams; and/or obtain the average output traffic based on the output traffic and the total quantity of data streams; and/or obtain the average quantity of data streams based on the total quantity of data streams and the total quantity of edge nodes; and/or obtain the average quantity of audience users based on the total quantity of audience users and the total quantity of edge nodes; and/or obtain the average output traffic based on the output traffic and the total quantity of edge nodes.

Optionally, the traffic obtaining module 902 is configured to: when historically obtained service requirement information includes the service requirement information of the live service and historically obtained data stream attribute information includes the data stream attribute information of the live service, obtain, based on the retrieval traffic, the first ratio, and the retrieval rate prediction model, the retrieval rate corresponding to the live service in the first time period.

Optionally, the apparatus 900 further includes:

a model obtaining module 904 is configured, configured to obtain the retrieval rate prediction model based on at least one training sample, where each training sample includes historically obtained retrieval traffic, a historically obtained first ratio, and a retrieval rate obtained based on the historically obtained retrieval traffic and the historically obtained first ratio.

Optionally, for a detailed implementation process in which the model obtaining module 904 obtains the retrieval rate prediction model based on the at least one training sample, refer to related content in operations 6021 to 6023 in the method 600 shown in FIG. 6. Details are not described herein again.

Optionally, the apparatus 900 further includes:

a fee obtaining module 905, configured to obtain, based on the retrieval traffic and the output traffic, a fee required for transmitting the live service in the content delivery network.

In this embodiment of this disclosure, the information obtaining module obtains the service requirement information of the live service and the data stream attribute information of the live service in the first time period, where the service requirement information is used to describe a status of transmitting the data stream of the live service in the content delivery network in the first time period, and the first time period is after the current time. The traffic obtaining module obtains, based on the service requirement information and the data stream attribute information, the retrieval traffic and the output traffic that are generated by the live service in the first time period. The resource allocation module allocates the network resource in the content delivery network based on the retrieval traffic and the output traffic. Because the information obtaining module obtains the data stream attribute information of the live service, and the traffic obtaining module obtains, based on the service attribute information and the service requirement information of the live service, the retrieval traffic and the output traffic that are generated by the live service in the first time period, traffic is obtained with reference to a data stream attribute of the live service. Data stream attributes of the live service in different time periods may be different, and retrieval traffic obtained based on data stream attributes in different time periods is also different, thereby improving flexibility of allocating the network resource.

Figure 10:
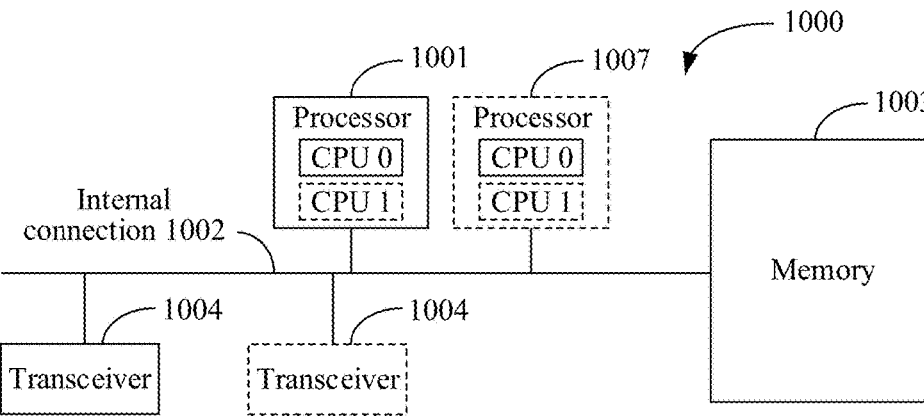
FIG. 10 is a diagram of a structure of a computer device according to an embodiment of this disclosure.

FIG. 10 is a diagram of a computer device 1000 according to an embodiment of this disclosure. The computer device 1000 may be the management device in any one of the foregoing embodiments. For example, the computer device 1000 may be the management device in the network architecture 200 shown in FIG. 2, or the management device in the method 400 shown in FIG. 4 or the method 600 shown in FIG. 6. The computer device 1000 includes at least one processor 1001, an internal connection 1002, a memory 1003, and at least one transceiver 1004.

The computer device 1000 is an apparatus of a hardware structure, and may be configured to implement functional modules in the apparatus 900 shown in FIG. 9. For example, a person skilled in the art may figure out that the information obtaining module 901, the traffic obtaining module 902, the resource allocation module 903, the model obtaining module 904, and the fee obtaining module 905 in the apparatus 900 shown in FIG. 9 may be implemented by using the at least one processor 1001 by invoking code in the memory 1003.

Optionally, the computer device 1000 may be further configured to implement a function of the management device in any one of the foregoing embodiments.

Optionally, the processor 1001 may be a general-purpose central processing unit (CPU), a network processor (NP), a microprocessor, an application-specific integrated circuit (ASIC), or one or more integrated circuits configured to control program execution of the solutions in this application.

The internal connection 1002 may include a channel in which information is transmitted between the foregoing components. Optionally, the internal connection 1002 is a board, a bus, or the like.

The transceiver 1004 is configured to communicate with another device or a communication network.

The memory 1003 may be a read-only memory (ROM) or another type of static storage device that can store static information and instructions, a random access memory (RAM) or another type of dynamic storage device that can store information and instructions; or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), and a disk storage medium or another disk storage device, or any other medium that can be used to carry or store expected program code in a form of instructions or a data structure and that can be accessed by a computer. However, the memory 1003 is not limited herein. The memory may exist independently, and is connected to the processor through the bus. The memory may alternatively be integrated with the processor.

The memory 1003 is configured to store application code for performing the solutions in this application, and the application code is executed under control of the processor 1001. The processor 1001 is configured to execute the application code stored in the memory 1003, and cooperate with the at least one transceiver 1004, to enable the computer device 1000 to implement a function in the method in this patent.

During specific implementation, in an embodiment, the processor 1001 may include one or more CPUs, for example, a CPU 0 and a CPU 1 in FIG. 10.

During specific implementation, in an embodiment, the computer device 1000 may include a plurality of processors, for example, the processor 1001 and a processor 1007 shown in FIG. 10. Each of the processors may be a single-core processor, or may be a multi-core processor. The processor herein may be one or more devices, circuits, and/or processing cores configured to process data (for example, computer program instructions).

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

The foregoing descriptions are only optional embodiments of this disclosure, but are not intended to limit this disclosure. Any modification, equivalent replacement, or improvement made within the principle of this disclosure should fall within the protection scope of this disclosure.

The invention claimed is:

1. A method, wherein the method comprises:
obtaining, by a management device, service requirement information of a live service and data stream attribute information of the live service in a first time period, wherein the service requirement information describes a status of transmitting a data stream of the live service in a content delivery network in the first time period, the first time period is after a current time, the content delivery network comprises a central node and an edge node, the central node is configured to send a data stream from an anchor user of the live service to the edge node, and the edge node is configured to send the data stream to an audience user requesting the data stream;
obtaining, by the management device based on the service requirement information and the data stream attribute information, retrieval traffic and output traffic that are generated by the live service in the first time period, wherein the retrieval traffic is generated by sending the data stream by the central node, and the output traffic is generated by sending the data stream by the edge node; and
allocating, by the management device, a network resource in the content delivery network based on the retrieval traffic and the output traffic.

2. The method according to claim 1, wherein:
the service requirement information comprises the output traffic, and the data stream attribute information comprises a first ratio of a cold stream, a warm stream, and a hot stream of the live service; and
obtaining, based on the service requirement information and the data stream attribute information, the retrieval traffic generated by the live service in the first time period comprises:
obtaining, based on the first ratio, a retrieval rate corresponding to the live service in the first time period, wherein the retrieval rate is a ratio of the retrieval traffic to the output traffic; and
obtaining the retrieval traffic based on the retrieval rate and the output traffic.

3. The method according to claim 2, wherein:

the service requirement information further comprises a total quantity of data streams that need to be sent by the anchor user of the live service to the central node in the first time period; and obtaining, based on the first ratio, the retrieval rate corresponding to the live service in the first time period comprises:

obtaining, based on the total quantity of data streams and the first ratio, the retrieval rate corresponding to the live service in the first time period.

4. The method according to claim 2, wherein the method further comprises:

obtaining, based on a quantity of standard edge nodes corresponding to each of a plurality of stream types, a quantity of edge nodes corresponding to each stream type in the first time period, wherein a quantity of audience users requesting a data stream of each stream type is different; and obtaining, based on the first ratio, the retrieval rate corresponding to the live service in the first time period comprises:

obtaining, based on a quantity of standard data streams corresponding to each stream type and the first ratio, a quantity of data streams corresponding to each stream type in the first time period; and obtaining, based on the quantity of data streams and the quantity of edge nodes that correspond to each stream type, the retrieval rate corresponding to the live service in the first time period.

5. The method according to claim 4, wherein obtaining, based on the quantity of standard edge nodes corresponding to each of the plurality of stream types, the quantity of edge nodes corresponding to each stream type in the first time period comprises:

obtaining, based on network information of the content delivery network and the quantity of standard edge nodes corresponding to each stream type, the quantity of edge nodes corresponding to each stream type in the first time period.

6. The method according to claim 2, wherein obtaining, based on the first ratio, the retrieval rate corresponding to the live service in the first time period comprises:

obtaining, based on the first ratio, the retrieval rate corresponding to the live service in the first time period when at least one of the following is satisfied:

when historically obtained service requirement information does not comprise the service requirement information of the live service; or when historically obtained data stream attribute information does not comprise the data stream attribute information of the live service.

7. The method according to claim 1, wherein the method further comprises:

obtaining, based on the retrieval traffic and the output traffic, a fee required for transmitting the live service in the content delivery network.

8. An apparatus, wherein the apparatus comprises at least one processor and one or more memories, wherein the one or more memories store programing instructions for execution by the at least one processor to:

obtain service requirement information of a live service and data stream attribute information of the live service in a first time period, wherein the service requirement information describes a status of transmitting a data stream of the live service in a content delivery network in the first time period, the first time period is after a current time, the content delivery network comprises a central node and an edge node, the central node is configured to send a data stream from an anchor user of the live service to the edge node, and the edge node is configured to send the data stream to an audience user requesting the data stream;

obtain, based on the service requirement information and the data stream attribute information, retrieval traffic and output traffic that are generated by the live service in the first time period, wherein the retrieval traffic is generated by sending the data stream by the central node, and the output traffic is generated by sending the data stream by the edge node; and allocate a network resource in the content delivery network based on the retrieval traffic and the output traffic.

9. The apparatus according to claim 8, wherein:

the service requirement information comprises the output traffic, and the data stream attribute information comprises a first ratio of a cold stream, a warm stream, and a hot stream of the live service; and the one or more memories store the programming instructions for execution by the at least one processor to:

obtain, based on the first ratio, a retrieval rate corresponding to the live service in the first time period, wherein the retrieval rate is a ratio of the retrieval traffic to the output traffic; and obtain the retrieval traffic based on the retrieval rate and the output traffic.

10. The apparatus according to claim 9, wherein:

the service requirement information further comprises a total quantity of data streams that need to be sent by the anchor user of the live service to the central node in the first time period; and the one or more memories store the programming instructions for execution by the at least one processor to obtain, based on the total quantity of data streams and the first ratio, the retrieval rate corresponding to the live service in the first time period.

11. The apparatus according to claim 9, wherein the one or more memories store the programming instructions for execution by the at least one processor to:

obtain, based on a quantity of standard edge nodes corresponding to each of a plurality of stream types, a quantity of edge nodes corresponding to each stream type in the first time period, wherein a quantity of audience users requesting a data stream of each stream type is different;

obtain, based on a quantity of standard data streams corresponding to each stream type and the first ratio, a quantity of data streams corresponding to each stream type in the first time period; and obtain, based on the quantity of data streams and the quantity of edge nodes that correspond to each stream type, the retrieval rate corresponding to the live service in the first time period.

12. The apparatus according to claim 11, wherein the one or more memories store the programming instructions for execution by the at least one processor to:

obtain, based on network information of the content delivery network and the quantity of standard edge nodes corresponding to each stream type, the quantity of edge nodes corresponding to each stream type in the first time period.

13. The apparatus according to claim 9, wherein the one or more memories store the programming instructions for execution by the at least one processor to:

obtain, based on the first ratio, the retrieval rate corresponding to the live service in the first time period when at least one of the following is satisfied:

when historically obtained service requirement information does not comprise the service requirement information of the live service; or when historically obtained data stream attribute information does not comprise the data stream attribute information of the live service.

14. The apparatus according to claim 8, wherein the one or more memories store the programming instructions for execution by the at least one processor to obtain, based on the retrieval traffic and the output traffic, a fee required for transmitting the live service in the content delivery network.

15. A non-transitory computer-readable storage medium, wherein the non-transitory computer-readable storage medium stores programming instructions for execution by at least one processor to:

obtain service requirement information of a live service and data stream attribute information of the live service in a first time period, wherein the service requirement information describes a status of transmitting a data stream of the live service in a content delivery network in the first time period, the first time period is after a current time, the content delivery network comprises a central node and an edge node, the central node is configured to send a data stream from an anchor user of the live service to the edge node, and the edge node is configured to send the data stream to an audience user requesting the data stream;

obtain, based on the service requirement information and the data stream attribute information, retrieval traffic and output traffic that are generated by the live service in the first time period, wherein the retrieval traffic is generated by sending the data stream by the central node, and the output traffic is generated by sending the data stream by the edge node; and allocate a network resource in the content delivery network based on the retrieval traffic and the output traffic.

16. The non-transitory computer-readable storage medium according to claim 15, wherein:

the service requirement information comprises the output traffic, and the data stream attribute information comprises a first ratio of a cold stream, a warm stream, and a hot stream of the live service; and the non-transitory computer-readable storage medium stores the programming instructions for execution by at least one processor to:

obtain, based on the first ratio, a retrieval rate corresponding to the live service in the first time period, wherein the retrieval rate is a ratio of the retrieval traffic to the output traffic; and obtain the retrieval traffic based on the retrieval rate and the output traffic.

17. The non-transitory computer-readable storage medium according to claim 16, wherein:

the service requirement information further comprises a total quantity of data streams that need to be sent by the anchor user of the live service to the central node in the first time period; and the non-transitory computer-readable storage medium stores the programming instructions for execution by at least one processor to:

obtain, based on the total quantity of data streams and the first ratio, the retrieval rate corresponding to the live service in the first time period.

18. The non-transitory computer-readable storage medium according to claim 16, wherein the non-transitory computer-readable storage medium stores the programming instructions for execution by at least one processor to:

obtain, based on a quantity of standard edge nodes corresponding to each of a plurality of stream types, a quantity of edge nodes corresponding to each stream type in the first time period, wherein a quantity of audience users requesting a data stream of each stream type is different;

obtain, based on a quantity of standard data streams corresponding to each stream type and the first ratio, a quantity of data streams corresponding to each stream type in the first time period; and obtain, based on the quantity of data streams and the quantity of edge nodes that correspond to each stream type, the retrieval rate corresponding to the live service in the first time period.

19. The non-transitory computer-readable storage medium according to claim 18, wherein the non-transitory computer-readable storage medium stores the programming instructions for execution by at least one processor to:

obtain, based on network information of the content delivery network and the quantity of standard edge nodes corresponding to each stream type, the quantity of edge nodes corresponding to each stream type in the first time period.

20. The non-transitory computer-readable storage medium according to claim 16, wherein the non-transitory computer-readable storage medium stores the programming instructions for execution by at least one processor to:

obtain, based on the first ratio, the retrieval rate corresponding to the live service in the first time period when at least one of the following is satisfied:

when historically obtained service requirement information does not comprise the service requirement information of the live service; or when historically obtained data stream attribute information does not comprise the data stream attribute information of the live service.

* * * * *